US012412262B2

(12) United States Patent
Osman et al.

(10) Patent No.: US 12,412,262 B2
(45) Date of Patent: Sep. 9, 2025

(54) VIDEO ANALYTICS FOR INDUSTRIAL FLOOR SETTING

(71) Applicant: Schlumberger Technology Corporation, Sugar Land, TX (US)

(72) Inventors: Ali Osman, Houston, TX (US); Akhil Dharamprakash Soni, Pune (IN); Pragati Kumar Singh, Pune (IN); Swayan Jeet Mishra, Sundergarh (IN); Anshuman Chakravarty, Pune (IN); Abhishek Dubey, Pune (IN); Aakash Aakash, Pune (IN); Anurag Chandrakar, Pune (IN); Sanjyot Samarth Zade, Pune (IN); Abhishek Kumar, Pune (IN); Hardik Tejani, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 24 days.

(21) Appl. No.: 18/581,590

(22) Filed: Feb. 20, 2024

(65) Prior Publication Data

US 2024/0281954 A1 Aug. 22, 2024

Related U.S. Application Data

(60) Provisional application No. 63/485,939, filed on Feb. 20, 2023.

(51) Int. Cl.
*G06V 20/52* (2022.01)
*G06T 7/00* (2017.01)
(Continued)

(52) U.S. Cl.
CPC ............ *G06T 7/0004* (2013.01); *G06T 7/215* (2017.01); *G06V 10/30* (2022.01); *G06V 10/70* (2022.01);
(Continued)

(58) Field of Classification Search
CPC . G06T 2207/20056; G06T 2207/30232; G06T 2207/30242; G06T 7/0004;
(Continued)

(56) References Cited

U.S. PATENT DOCUMENTS 11,164,134 B2 11/2021 Barak
2009/0089108 A1 4/2009 Angell
(Continued)

FOREIGN PATENT DOCUMENTS

| KR | 102219809 B1 | 2/2021 |
| KR | 102322644 B1 | 11/2021 |
| KR | 20220077404 A | 6/2022 |

OTHER PUBLICATIONS

Search Report and Written Opinion of International Application No. PCT/US2024/016417 dated Jun. 10, 2024, 13 pages.

*Primary Examiner* — Kenny A Cese
(74) *Attorney, Agent, or Firm* — Jeffrey D. Frantz

(57) ABSTRACT

Safety non-compliance and, simultaneously, productivity metrices are computed and tracked. Objects of interest (such as technicians, tools, cranes, slings, gloves, assets) are identified and tracked from real time streams of cameras through the application of several filtration processes (boundary based, aspect-ratio based, intersection-over-union based, dice coefficient-based, and custom model bounding box filtration techniques) and are then projected onto a 2D homographic map which localizes their position. The localized position is filtered using custom time series and frequency-based filters and aggregated over a set of defined time ranges to obtain productivity and safety KPIs. Non-compliance detections are flagged with video recorded for the given time duration and anonymized with custom processes to ensure data privacy. Productivity KPIs are repre-
(Continued)

sented in a dashboard with readings collected at different time intervals like hourly, daily, weekly and monthly.

11 Claims, 46 Drawing Sheets

(51) Int. Cl.
  *G06T 7/215* (2017.01)
  *G06V 10/30* (2022.01)
  *G06V 10/70* (2022.01)
  *G06V 40/10* (2022.01)

(52) U.S. Cl.
  CPC .............. *G06V 20/52* (2022.01); *G06V 40/10* (2022.01); *G06T 2207/20056* (2013.01); *G06T 2207/30232* (2013.01); *G06T 2207/30242* (2013.01)

(58) Field of Classification Search
  CPC ........ G06T 7/215; G06V 10/30; G06V 10/70; G06V 20/52; G06V 40/10
  See application file for complete search history.

(56) References Cited

U.S. PATENT DOCUMENTS

| | | | |
|---|---|---|---|
| 2017/0245806 A1* | 8/2017 | Elhawary | A61B 5/1122 |
| 2020/0174517 A1* | 6/2020 | Martinez | G06Q 10/06398 |
| 2021/0082220 A1* | 3/2021 | Boerger | G06Q 10/083 |
| 2021/0103282 A1* | 4/2021 | Staszel | G05D 1/0088 |
| 2021/0182748 A1* | 6/2021 | Grant | G06Q 10/0635 |
| 2021/0233255 A1* | 7/2021 | Celestini | G06T 7/292 |
| 2021/0391089 A1* | 12/2021 | Eswara | G06V 20/53 |
| 2022/0083948 A1* | 3/2022 | Robertson | G06Q 10/0635 |

\* cited by examiner

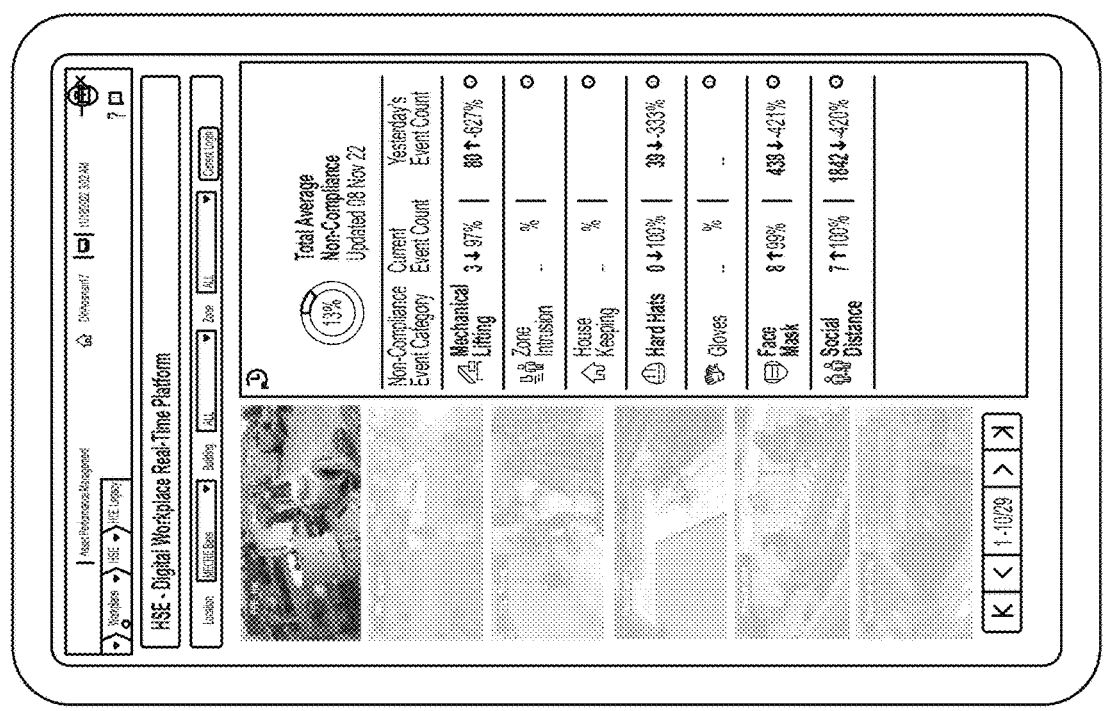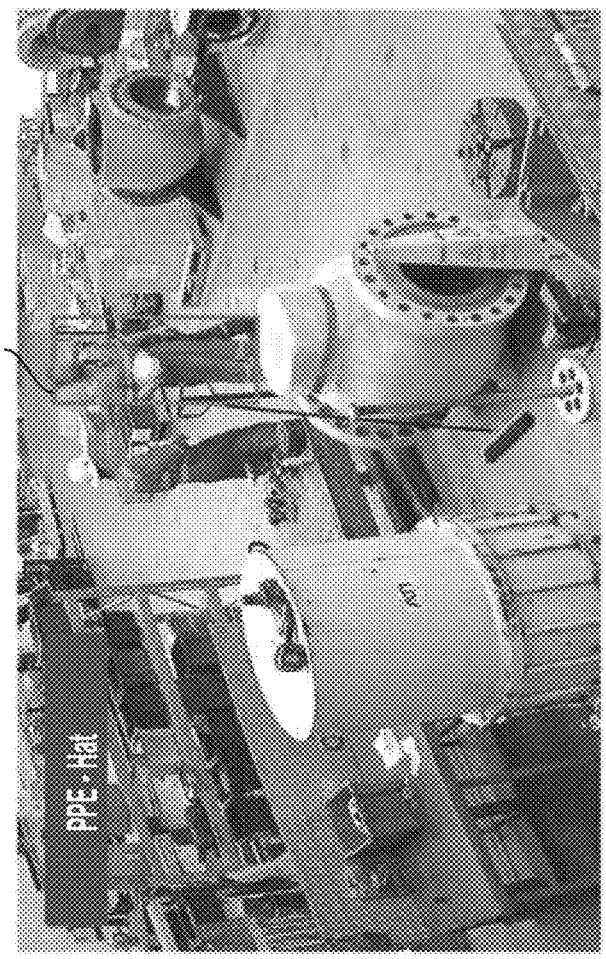
FIG. 2

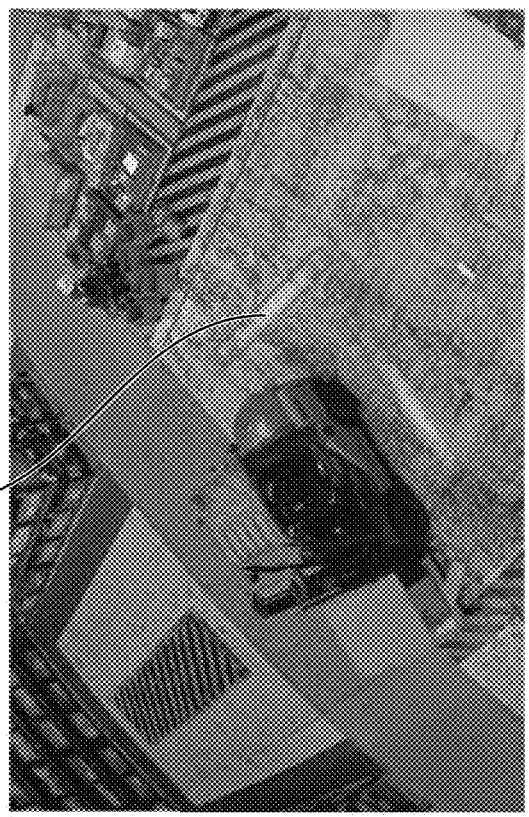
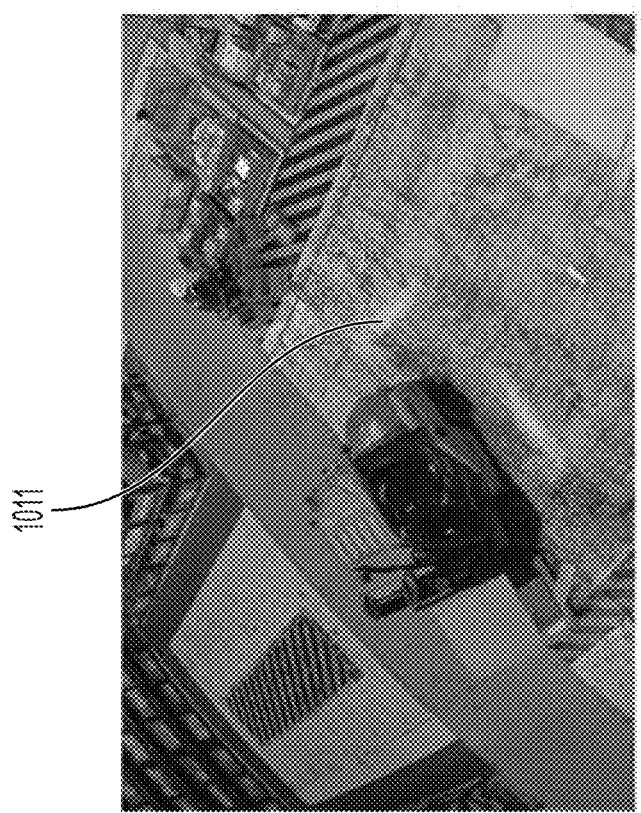
FIG. 4A

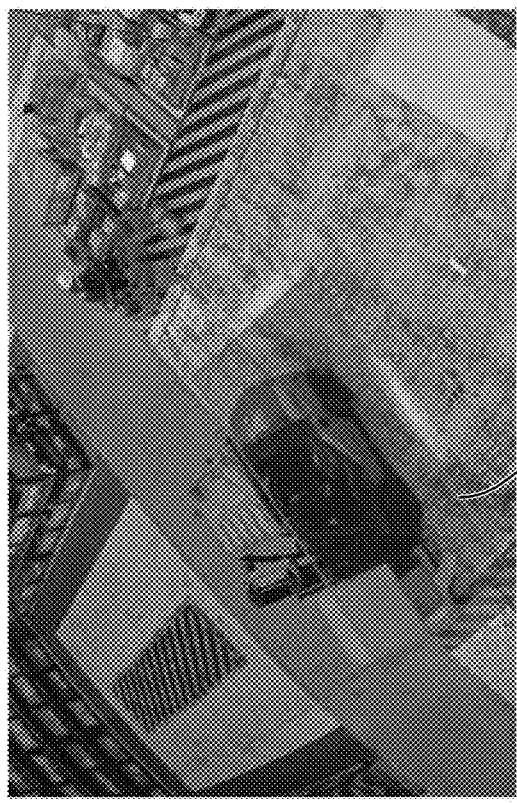
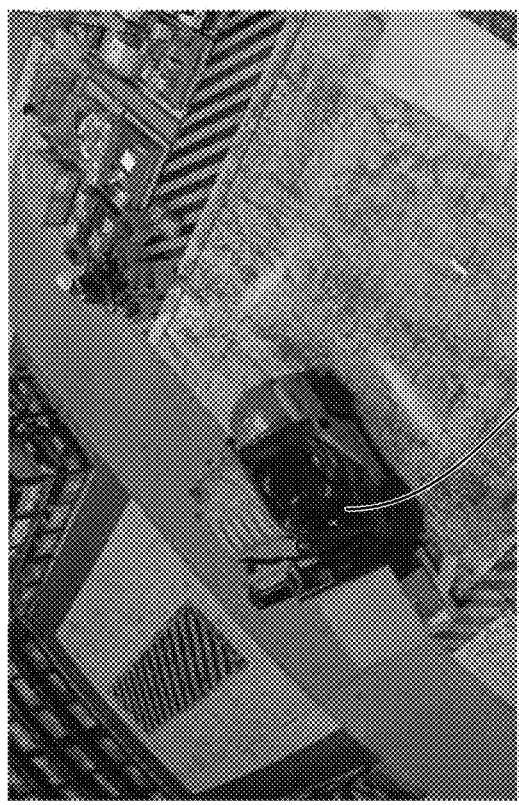
FIG. 4D

Tool on bench Time

Bench Utilization

Data Entry Time

Wrench Time

Technician Hours

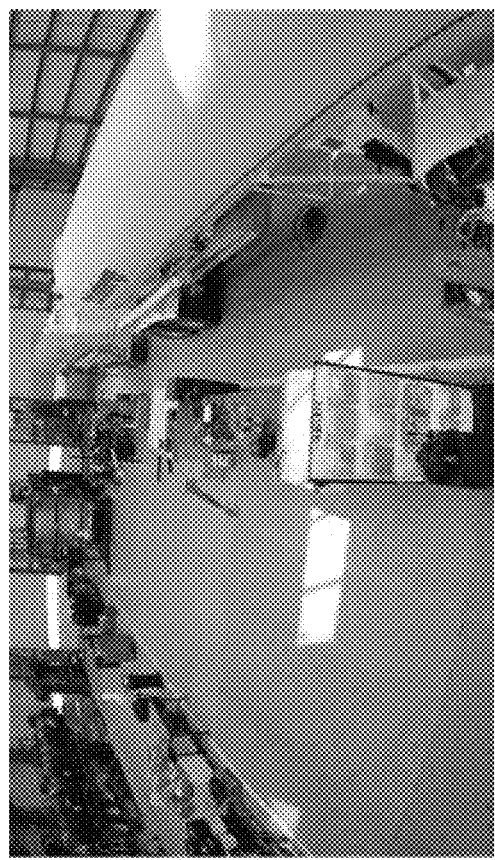
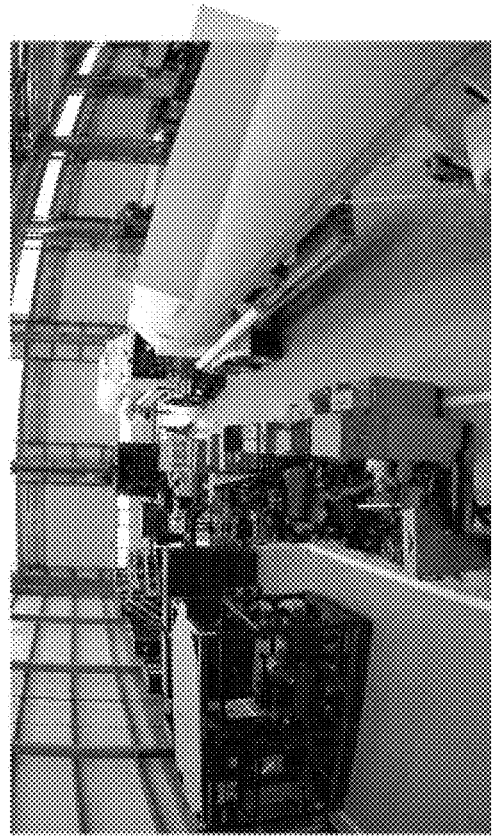
FIG. 61 CONTINUED

VIDEO ANALYTICS FOR INDUSTRIAL FLOOR SETTING

CROSS-REFERENCE TO RELATED APPLICATIONS

This application claims priority to U.S. Provisional Patent Application No. 63/485,939, filed on Feb. 20, 2023, which is incorporated herein by reference in its entirety.

BACKGROUND

Industrial shop or workshop floors are often the setting of risky manual activities that can lead to worker injury. Companies have active health and safety departments that try and set safeguards, procedures, and best practices to lower the number of these injuries. Nevertheless, injuries continue to occur, and shop workflows continue to increase in complexity and risk. Existing solutions to monitor safety and productivity require significant manual intervention which is prone to bias and is less accurate.

There is therefore a need for additional systems and methods to prevent injury to workers on shop floors. In turn, the same systems can also be used to track worker productivity metrics.

SUMMARY

A method for detecting safety non-compliance and monitoring performance in a workshop. The method also includes receiving data, where the data may include image data, video data, or both, and where the data is received from the workshop; executing artificial intelligence processes to perform mechanical lifting non-compliance detection, generic load lifting non-compliance detection, personnel proximity to moving vehicle detection by processing the data to produce processed image data; aggregating the processing image data at various levels in the workshop; determining an estimate of the safety non-compliance from the aggregated data; determining the performance for workflows associated with the workshop based on the aggregated data, the estimate, or both; generating a first instruction to implement behavior to correct the safety non-compliance; and generating a plan to address the performance. Other embodiments of this aspect include corresponding computer systems, apparatus, and computer programs recorded on one or more computer storage devices, each configured to perform the actions of the methods.

A computing system includes one or more processors, and a memory system. The memory system may include one or more non-transitory computer-readable media storing instructions that, when executed by at least one of the one or more processors, cause the computing system to perform operations, the operations include: receiving data, where the data may include image data, video data, or both, and where the data is received from the workshop; executing artificial intelligence processes to perform mechanical lifting non-compliance detection, generic load lifting non-compliance detection, personnel proximity to moving vehicle detection by processing the data to produce processed image data; filtering the processed image data using a plurality of filters to produce filtered data; aggregating the filtered data at various levels in the workshop; executing data correction processes on the aggregated filtered data over a plurality of time stamps producing corrected data; determining an estimate of the safety non-compliance from the corrected data; providing alerts associated with the estimate; determining the performance for workflows associated with the workshop based on the corrected data, the estimate, or both; displaying the performance and personnel during the safety non-compliance; and generating an instruction to implement behavior to correct the safety non-compliance. Other embodiments of this aspect include corresponding computer systems, apparatus, and computer programs recorded on one or more computer storage devices, each configured to perform the actions of the methods. The system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

A non-transitory computer-readable medium can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for detecting safety non-compliance and monitoring performance in a workshop. The method also includes receiving data, where the data may include image data, video data, or both, and where the data is received from the workshop, where the data include images from use cases, where the use cases include personal protective equipment non-compliance detection, tracking of personnel, workshop utilization, technician count, asset identification, mechanical lifting non-compliance detection, tool non-compliance detection, red zone non-compliance detection, tagline non-compliance detection, personnel anonymization, generic load non-compliance detection, proximity to moving vehicle detection, and performance indicator determination; executing artificial intelligence processes to process the data to produce processed image data, where the artificial intelligence processes include object tracking, scene subtraction, pose estimation, and key-point estimation, where the scene subtraction includes detection of moving objects and segmentation of objects, where the moving objects include tools, the personnel, slings, vehicles, and taglines, and the segmentation includes tool and hand segmentation.

The artificial intelligence processes execute on edge devices or devices remote to the workshop or both, and the artificial intelligence processes include models, where the models include a light model and a heavy model, where the light model detects events, where the events may include workshop-related events. The method also includes that the heavy model processes the data when the light model detects the workshop-related events. The method includes filtering the processed image data using a plurality of filters to produce filtered data, where the plurality of filters removes false positive examples based on pre-defined object metrics, aspect ratio, intersection over union, and dice coefficient, and the plurality of filters includes slicing aided hyper-inferencing and confluence, where the slicing aided hyper-inferencing enables the objects within a pre-selected distance from a collection device to be detected. The method also includes that the plurality of filters includes confluence, where the confluence enables overlapping object types to be detected.

The method includes aggregating the filtered data at various levels in the workshop, where the filtered data are aggregated across workshop bays, floors, buildings, and locations, and time periods. The aggregated data are mapped from a 2D mapping projecting camera viewpoint onto a 2D map using homographic transformation, where the aggregated data preserve a consistent person identification during the personnel tracking to accurately determine a count of the personnel. The homographic transformation protects the object from over/under count. The method includes massaging the aggregated data, where massaging may include executing operations to update a fidelity and an accuracy of the aggregated data.

The method includes executing data correction processes on the aggregated filtered data over a plurality of time stamps producing corrected data. The data correction includes removing random noisy data from the aggregated filtered data producing intermediate data, where the random noisy data include discrepancies in the count of the personnel. The method also includes counting the personnel from frame to frame of the intermediate data, where the personnel are counted as they pass a location in the workshop, and the personnel are counted as they are working on assets.

The method includes filtering the corrected data using a low pass filter and/or a time series filter, where the low pass filter includes a moving average filter, where the moving average filter removes jitters in the intermediate data, where the jitters arise from the count of the personnel in a bay or the personnel passing other personnel who are handling the tools. The method also includes performing a fast Fourier transform (FFT) using FFT convolution on the intermediate data to produce time series data, and detecting anomalies/outliers in the time series data by identifying trends, seasonality, and noise in the time series data to produce the corrected data.

The method includes determining an estimate of the safety non-compliance in the use cases from the corrected data, where the estimate is based on pre-selected thresholds for the use cases. The method also includes providing alerts associated with the estimate. The method includes determining the performance for workflows associated with the workshop based on the corrected data, the estimate, or both, and displaying the performance and the personnel during the safety non-compliance.

The performance is computed at a plurality of the time stamps, the performance includes the count of the personnel in a location, a personal protective equipment usage non-compliance percentage, a vehicle encounter non-compliance percentage, a mechanical lifting non-compliance percentage, an amount of a wrench time, an effective capacity, an amount of technician hours, an amount of data entry time, an amount of bench utilization, and an amount of tool on bench time. A state of the performance is changed based on the corrected data that are gathered at different of the time stamps, and a display of the personnel includes anonymizing the personnel in the display, where the anonymizing includes blurring the display. The method includes generating an instruction to implement behavior to correct the safety non-compliance. Other embodiments of this aspect include corresponding computer systems, apparatus, and computer programs recorded on one or more computer storage devices, each configured to perform the actions of the methods.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 2 is a photographic illustration of a person not wearing a hard hat.

FIG. 3I is a photographic representation of the intersection of contours.

FIG. 3O is a photographic representation of a person is placing a hand on a moving tool.

FIG. 4A is a photographic representation of indicators of the location of a moving vehicle.

FIG. 4D is a photographic representation of an unsafe region around a moving vehicle.

FIG. 6I is a photographic representation of views from different cameras and their blind spot in the workshop area.

FIG. 6L is a photographic representation of

DETAILED DESCRIPTION

Figure 1A:
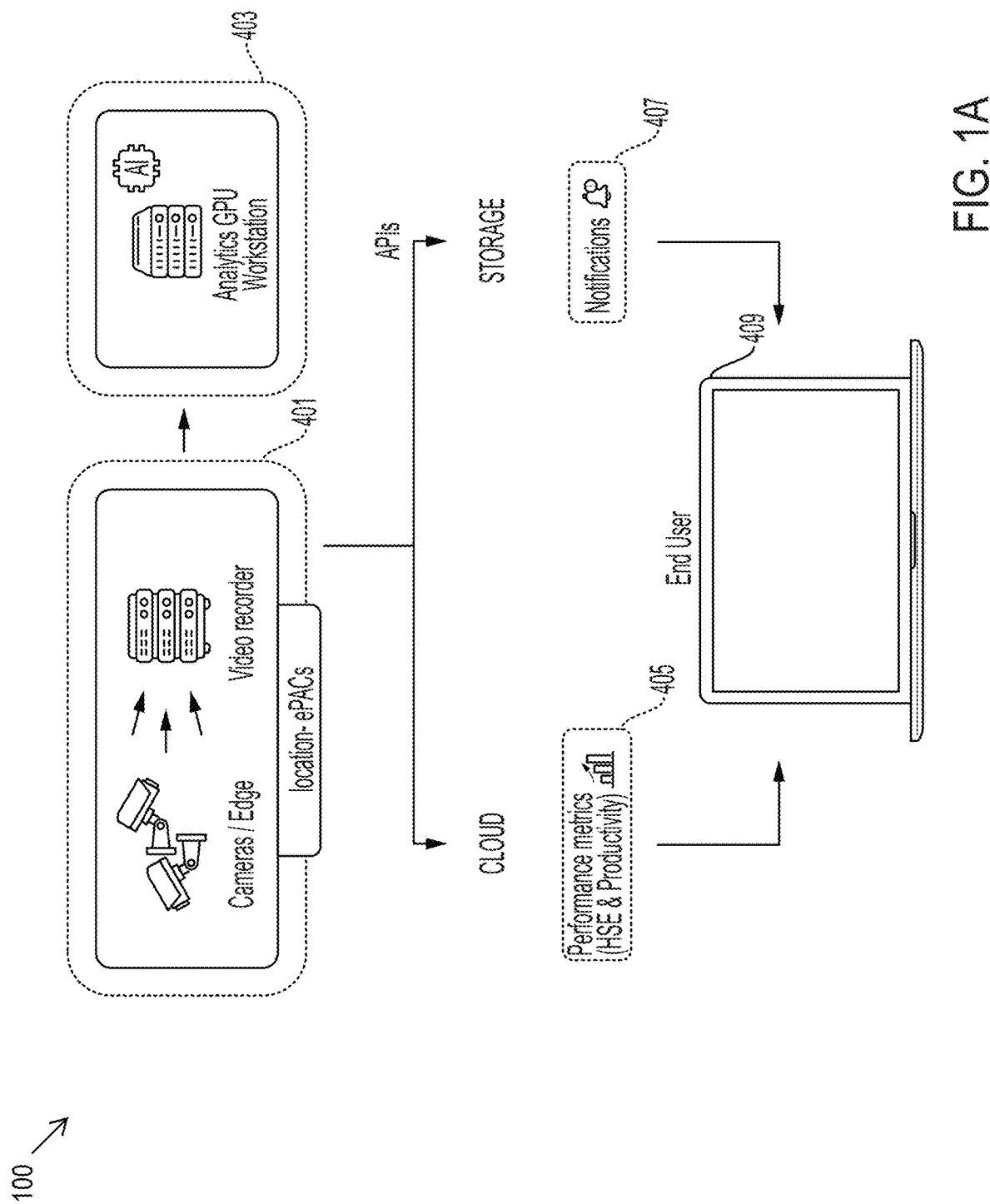
FIG. 1A is a schematic block diagram of a system architecture in accordance with embodiments of the present disclosure.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context. Attention is now directed to processing procedures, methods, techniques, and workflows that are in accordance with some embodiments. Some operations in the processing procedures, methods, techniques, and workflows disclosed herein may be combined and/or the order of some operations may be changed.

The system and method of present disclosure use advanced camera analytics not just to identify but also to automatically report any occurrences of noncompliance that may be taking place on the shop floor. To identify the noncompliance, the goal is to isolate a range of situations where systems can visually identify some condition that appears to contradict the health and safety guidelines of a business. For example, in the use case of zone intrusion, the system visually identifies when and where an object or person is located somewhere they should not be. The system can also scan and determine whether appropriate personal protective equipment (gloves, coveralls, hardhats, etc.) is being worn by people in certain floor locations or taking part in certain activities. The system can monitor static conditions to ensure items are stored safely or are not left in inappropriate locations. As another more dynamic and higher risk example, the system can track people and equipment to make sure correct health and safety procedures are followed during mechanical lifting operations. The system can also automatically detect a moving forklift and apply safety and monitoring procedures accordingly.

FIG. 1A shows a system architecture in accordance with embodiments of the present disclosure. Cameras 401 showing various locations of the shop floor are connected to an ethernet Programmable Automation Controller (cPAC) that controls their status and operation. In one embodiment, live video is constantly captured to a local server (not shown) and storage 407, before being securely routed by video management software to a Graphics Processing Unit (GPU) core server 403. This on-demand hardware divides up the processor-intensive tasks of applying the analytics processes that identify occurrences of noncompliance. In one embodiment, clips are securely uploaded to the cloud 405 for processing against KPIs before the resulting data are transferred to a unified operations center—an application that may also run on the cloud. This application can then send the noncompliance notifications out as specified and needed, and end users 409 of the application can interact with the data. In one embodiment, the application is a mobile application usable on phones or tablets.

Figure 1B:
FIG. 1B is a photographic representation of a system interface with the end user in accordance with embodiments of the present disclosure.

FIG. 1B shows a user experience with a system application in accordance with embodiments of the present disclosure. First, camera analytics processes identify an incident of non-compliance in progress. Next, a video snippet of around 20 seconds in length capturing the occurrence is generated. Facial blurring can then be automatically applied to the video to allow anonymous reporting. Finally, the video is sent as a notification to end users for feedback and actions.

Referring now to FIG. 2, in one embodiment, a system in accordance with embodiments of the present disclosure includes three stages. The first stage involves processes that are used to detect visual objects, track the objects, and detect key-point and pose of the objects. For example, the process used to detect visual objects can be an artificial intelligence vision model trained by use of data labelling. In such a model, to recognize a hard hat, the model is provided or trained on, as an example, 100 images labelled as hard hats. This gives a certain accuracy percentage which can be increased, such as by providing the model being trained with additional images labelled as hard hats. Additional images may also increase the accuracy percentage in situations involving multiple cameras, angles, and small objects. The second stage involves automatically tracking objects around camera boundaries, mapping objects from the camera view to the floor view, and consolidating camera and bay view outputs. The third stage involves automatically generating business key performance indicators (KPIs) based on the tracked data. In one embodiment, frame and minute level data are provided to business layer processes that are executed to generate KPIs such as, for example, but not limited to, the number of personnel in a location, personal protective equipment usage non-compliance percentage, and mechanical lifting non-compliance percentage.

FIG. 2 shows an example in which a system and method in accordance with embodiments of the present disclosure identify the inappropriate use of personal protective equipment (PPE) by identifying that the person 101 within a digital box has taken off his/her hard hat in a location where hard hats should be worn according to the shop health and safety procedures. An automatic hat non-compliance detection process uses image recognition technology to identify individuals and verify that they are wearing required protective headgear in compliance with safety regulations. The system also automatically associates hard hats with their wearers and automatically predicts hat non-compliance for people whose hard hats are not visible due to occlusion (from objects between the image sensor and the hard hat wearer) and the way a person bends/tilts the head while working, which together make the hard hat barely visible. To address occluded hard hats, the system automatically a) associates unique hard hats to individuals, b) detects whether the individual's head is visible, c) detects whether the individual or individual's head is bending, and d) identifies the hard hat in the top one third of the individual's bounding box detected.

In the example from FIG. 2, as well as other examples, a digital box is added by the system after the computer image is analyzed. Moreover, in all examples, the system reports an instance of non-compliance in order to mitigate the situation and ensure compliance with the health and safety procedures. Reports are optionally electronically sent to people on the shop floor or located elsewhere.

Figure 3A:
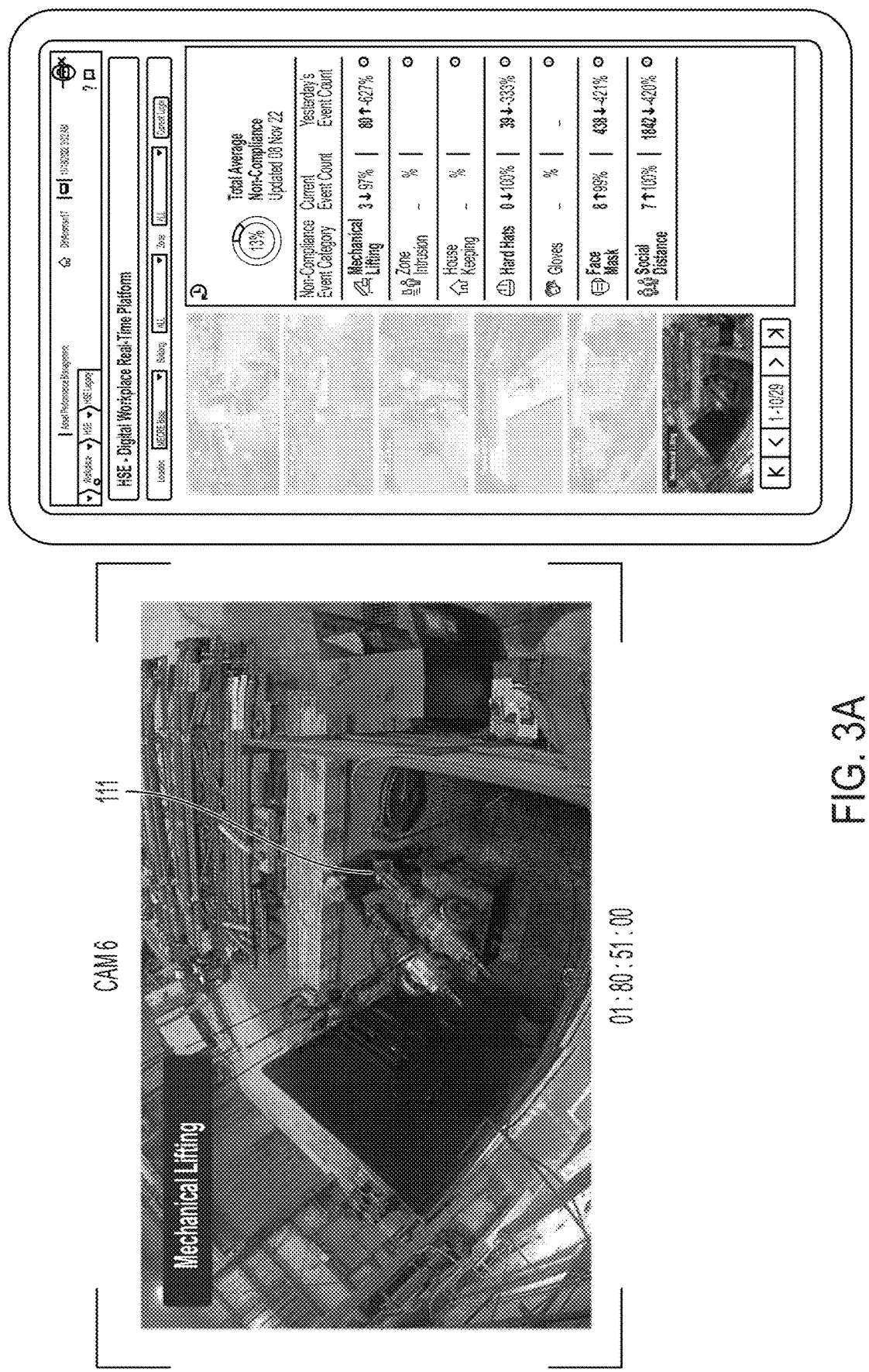
FIG. 3A is a photographic representation of a person practicing inappropriate mechanical lifting.

Referring now to FIG. 3A, in one embodiment, mechanical lifting safety compliance and performance indicators are enabled by mechanical lifting detection, double-sling detection, red zone detection, and tagline detection. In a workshop, bigger tools are lifted using cranes. Since the tools are generally large, protocols to prevent accidents can be followed. The protocols involve tying and using a sling while lifting the tool, directing a moving tool using a tagline, and ensuring that no person places a hand on or near the tool while the tool is being lifted. In one embodiment, the protocols are monitored and tracked using a two-step automated approach. The first step includes event check and video creation. In this step, live data are captured, mechanical lifting events area detected, the start and end times of the events are recorded, and a video is generated of the events between the start and end times. The second step includes a compliance check. In this step, for the generated videos, notifications are automatically generated when there is a pre-selected number of non-compliance events. For example, when the system checks for hand on tool non-compliance, notifications are generated for a maximum of one red zone per mechanical lifting event that would include the maximum non-compliance time.

Figure 3B:
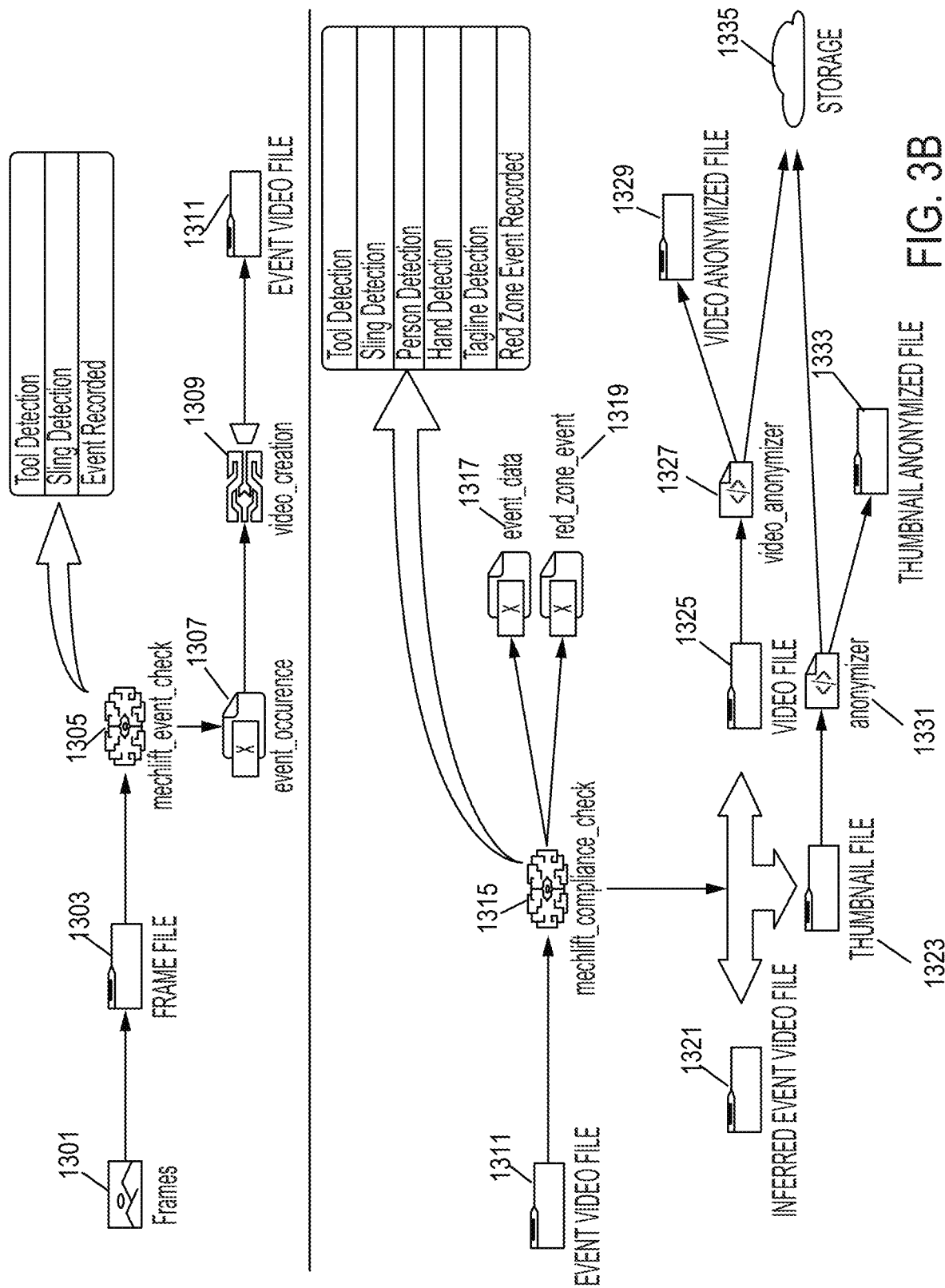
FIG. 3B is a flow diagram of the process for performing mechanical lifting safety compliance.
Figure 3C:
FIGS. 3C-3F are photographic representations of various tool and lifting events on the shop floor.
Figure 3D:
Figure 3E:
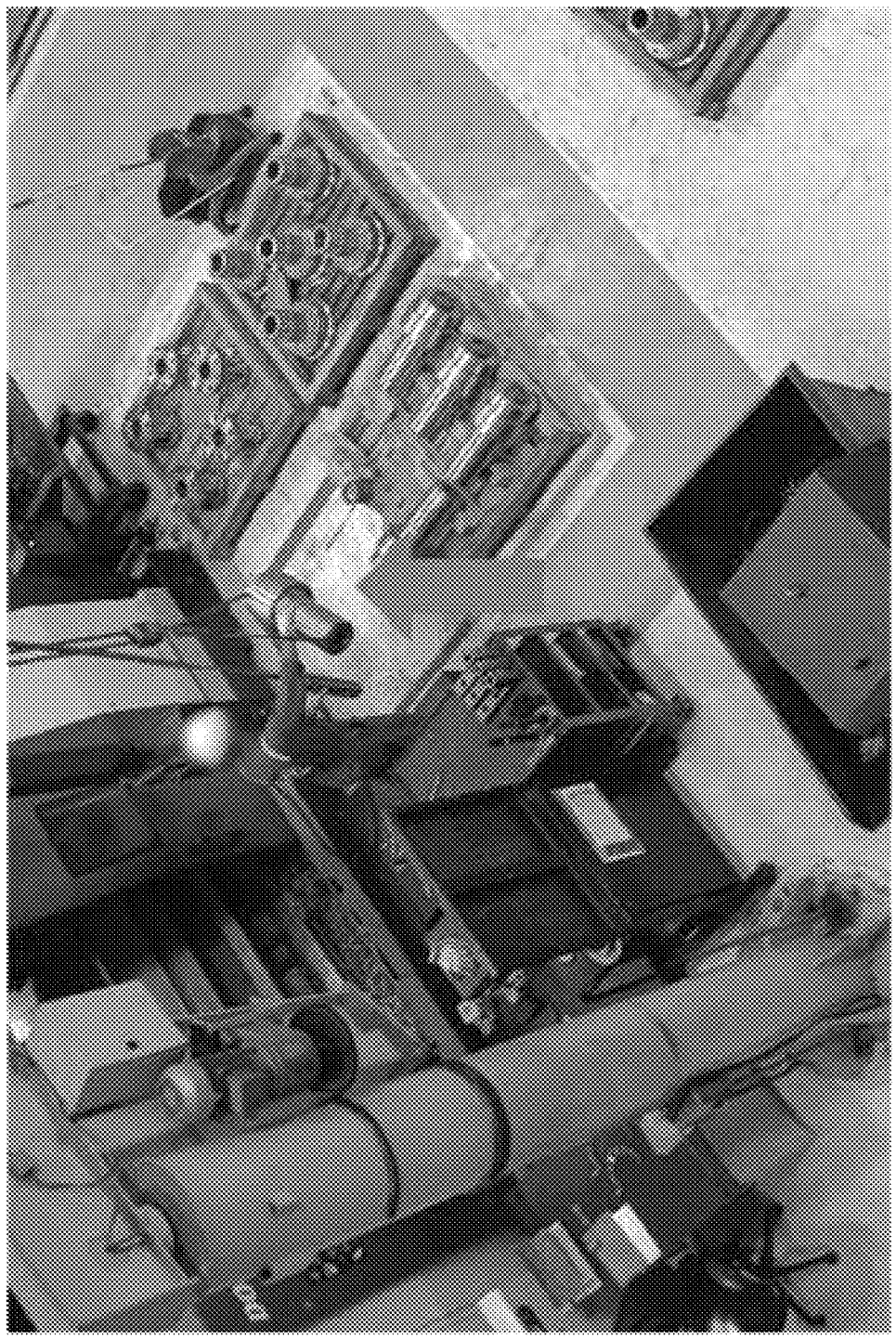
Figure 3F:

Referring now to FIG. 3B, the automatic method for performing mechanical lifting safety compliance gathers data derived from incoming streams of camera data 1301, possibly saved in storage 1303, that are processed according to a method that includes the steps of identifying moving objects in a camera frame based at least on custom masking and scene subtraction processes, determining the location and orientation of a tool based at least on object detection processes, mapping a detected tool onto a 2D plane based at least on a 2D projection homography matrix process, detecting 1305 individuals near the projected tool based at least on proximity determination criteria, combining 2D projection and camera stitching to verifying that a person is touching the tool, and sending an alert if a person is in direct contact with the moving tool. In one embodiment, the system and method in accordance with embodiments of the present disclosure process data that distinguish the load from other tools used in the shop, data that represent small objects, data that detect sling angle, data that detect hand placement based on processes such as, for example, but not limited to, object segmentation, pose estimation, and scene stitching, data that identify a red zone, data that map people and tool projects to a 2D floor, and data that track and isolate the person and the tool involved in the lifting. In one embodiment, the process is optimized to execute on a limited capacity server/device, for example, on an edge device. At the occurrence 1307 of an event, the system performs a mechanical lift compliance check 1315 using event data 1317 and red zone event data 1319. If there is a non-compliance event in the event video file 1311, an inferred event video file 1321 a thumbnail file 1323, and a compliance-checked video file 1325 are created. A video anonymized 1327 anonymizes the data in the compliance-checked video file 1325 and stores the anonymized data in a video anonymized file 1329, which can be moved to cloud storage 1335. A thumbnail anonymizer 1331 anonymizes the data in the thumbnail file 1323 and stores the anonymized data in a thumbnail anonymized file 1333, which can be moved to cloud storage 1335.

Referring now to FIGS. 3C-3F, to monitor and assess mechanical lifting events for various kinds of tools, an object detection model can be trained to isolate a specific kind of tool and to identify various kinds of lifting events. An automated system and method in accordance with embodiments of the present disclosure monitor and assess mechanical lifting events for tools of any shape, size or color as shown in FIGS. 3C-3F without training models for each kind of tool. The process involves the steps of event detection, i.e. determining the start and end of a mechanical lifting event, and non-compliance detection, i.e. isolating tagline and hand on tool violations inside each event.

Figure 3G:
FIG. 3G is a photographic representation of a bounding box around a moving sling and a dynamic zone of interest beneath the sling.

Referring now to FIG. 3G, for example, a sling detection model is used to generate a dynamic zone of interest below the sling. Objects are identified in the dynamic zone based on a combination of scene subtraction and contour detection processes. Specifically, a method in accordance with embodiments of the present disclosure includes isolating a moving sling 251 (FIG. 3D) based at least on a sling detection model, and generating a dynamic zone of interest 253 (FIG. 3D) below the moving sling 251 (FIG. 3D), using the dimensions of the detected sling bounding box 255 (FIG. 3G). In one embodiment, parameters relevant to the dynamic zone 253 (FIG. 3D) are as follows: dynamic_zone_xmin=xmin_sling−(sling_width/2), dynamic_zone_xmax=xmax_sling+(sling_width/2), dynamic_zone_ymin=ymax_sling−(sling_width/2), dynamic_zone_ymax=ymax_sling+(sling_width/2).

Figure 3H:
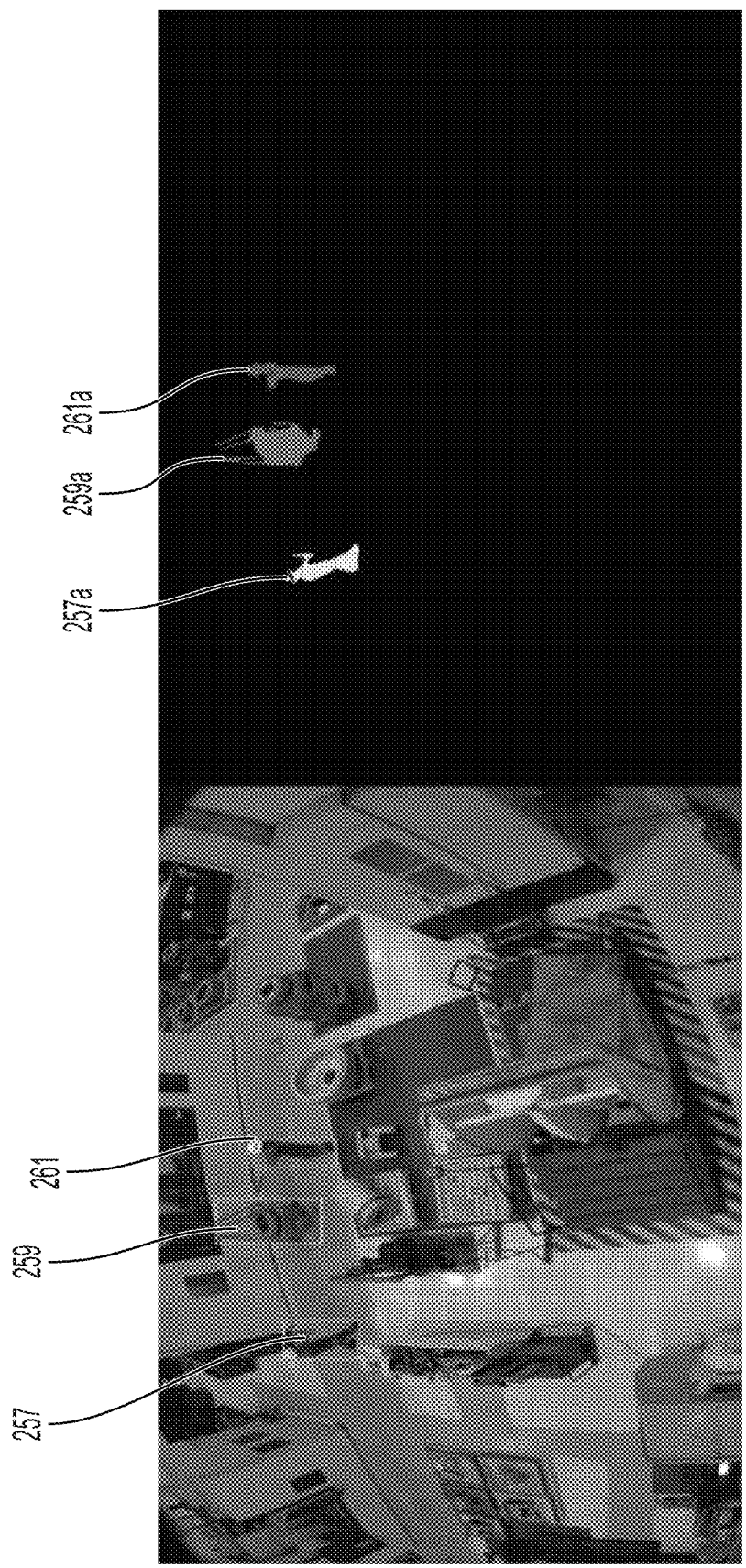
FIG. 3H is a photographic representation of identifying contours.
Figure 31:
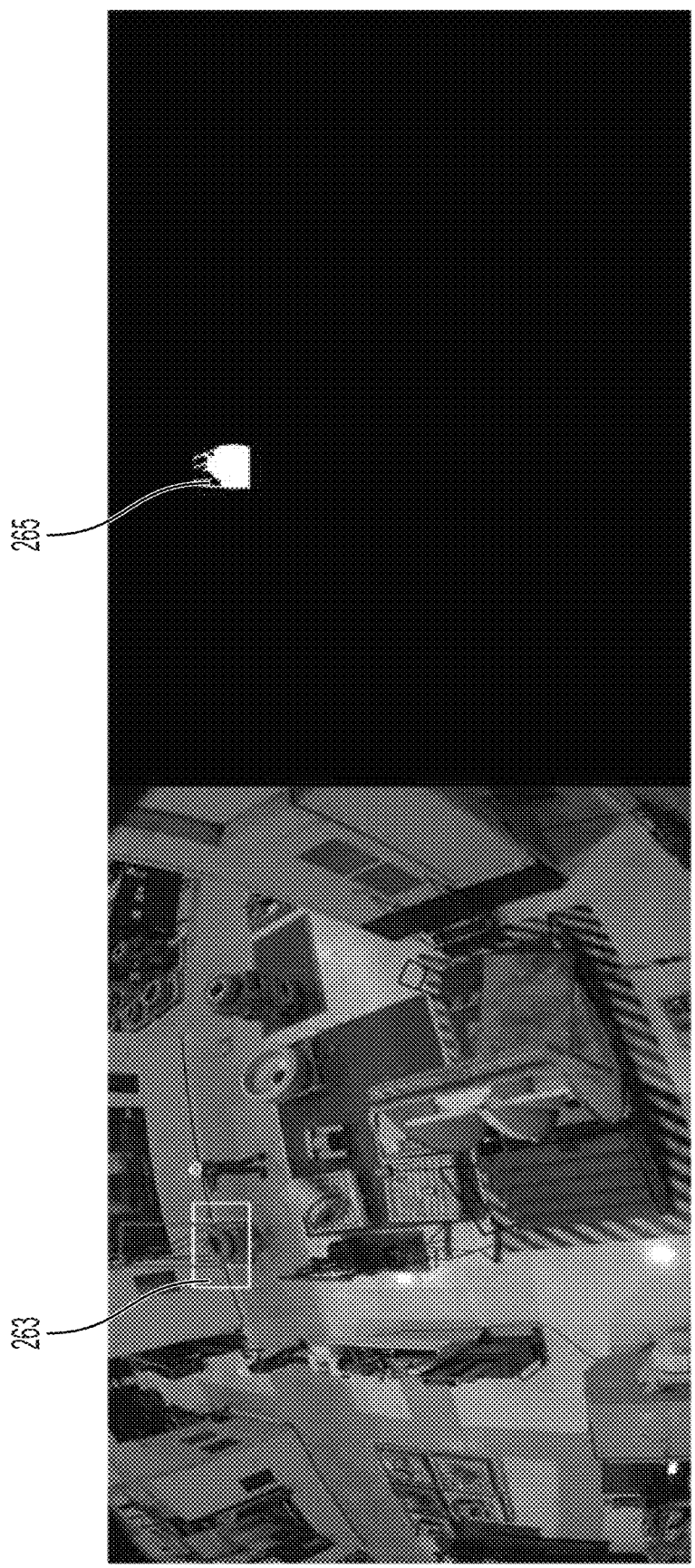

Referring now to FIG. 3H, the method includes isolating moving objects in the frame by finding contours 257, 259, and 261 on the scene subtracted frame, and filtering the contours to locate the contours 257a, 259a, and 261a that relate to the task. In one embodiment, very small objects are ignored, for example, but not limited to, when the contour area is smaller than 400 pixels, and when the object is shorter than a pre-selected threshold and narrower than a pre-selected threshold. The object should not be too tall or wide, for example, but not limited to, the contour aspect ratio should be less than 4.

Referring now to FIG. 3I, the method includes locating the intersection 263 of the contours 257a, 259a, and 261a (FIG. 3H) with the dynamic zone 253 (FIG. 3D), and selecting the contour 263 with a non-zero intersection value. In one embodiment, when a calculated intersection over union (IOU) is greater than 0.1, the intersection value is considered non-zero. The shape is isolated by surrounding it with a bounding box 263. The contour intersection 265 represents the moving tool. In one embodiment, a processor executes instructions to implement the automated tool detection process when a tool is found in more than four of six continuous frames, and a sling is detected. The processor ceases execution of the automated tool detection process when no tool is found for four out of six continuous frames. In one embodiment, thirty-six frames are required before the event is considered to be valid.

Figure 3J:
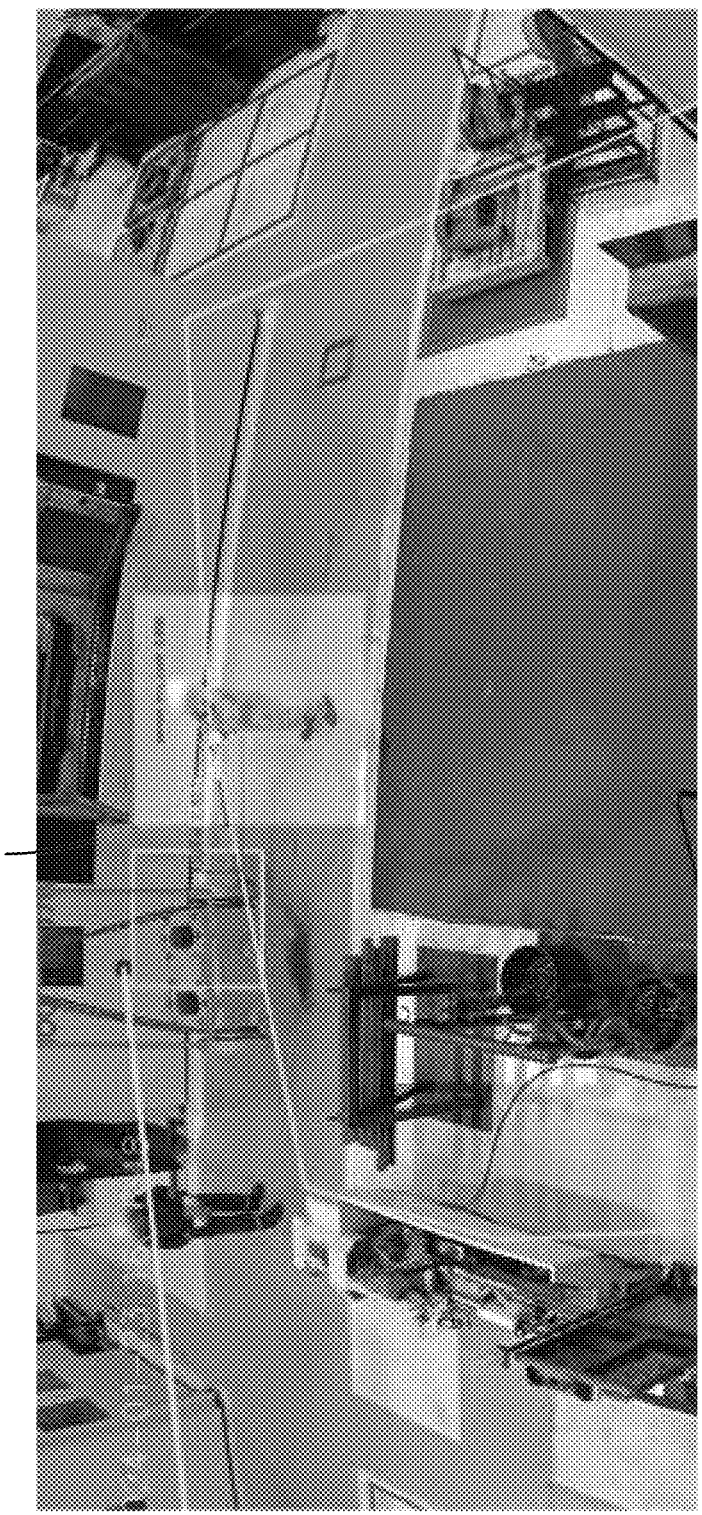
FIG. 3J is a photographic representation of a compliant sling event.

Referring now to FIG. 3J, to determine which events are considered for non-compliance detection, a system and method in accordance with embodiments of the present disclosure consider a sling event to be non-compliant when the maximum displacement of the sling in the event is more than a threshold value, for example, but not limited to, two feet. In the exemplary embodiment, the system and method determine the start time of an event, which set the initial starting point of a sling. The next step is to check sling displacement from the sling position from the start of the event, and at succeeding frames, followed by removing outliers. Outliers can include, but are not limited to including, being caused by sudden jitters in displacement. In one embodiment, inter-quartile range is used as a boundary for how large the displacement can be before it is determined to be an outlier. Other range metrics are contemplated by the present disclosure. In one embodiment, the height of the sling is used to calculate a pixel to actual height ratio which is used to convert a maximum displacement of sling in the event to feet. Other methods to derive this ratio are contemplated by the present disclosure. An average sling height is chosen, for example, 5 feet. The maximum displacement is compared to a maximum displacement threshold to determine if a non-compliant event has occurred.

Continuing to refer to FIG. 3J, during a mechanical lifting event, a tool requires directional supervision while it is moving. These supervisions are done by the worker using a tagline 271. The system and method in accordance with embodiments of the present disclosure automatically check if a person in the vicinity of moving tool is using a tagline to move the tool or not. In one embodiment, a person detection model is used to detect the persons who are moving the tool, and a tagline detection model is used to check for the tagline in the hands of that detected person. In the example shown in FIG. 3J, the technician is using a tagline and is otherwise compliant with safety requirements. If a person is not using a tagline to direct the tool as well as performing in other non-compliant ways, as shown in FIG. 3K, the technician is generally non-compliant.

Figure 3K:
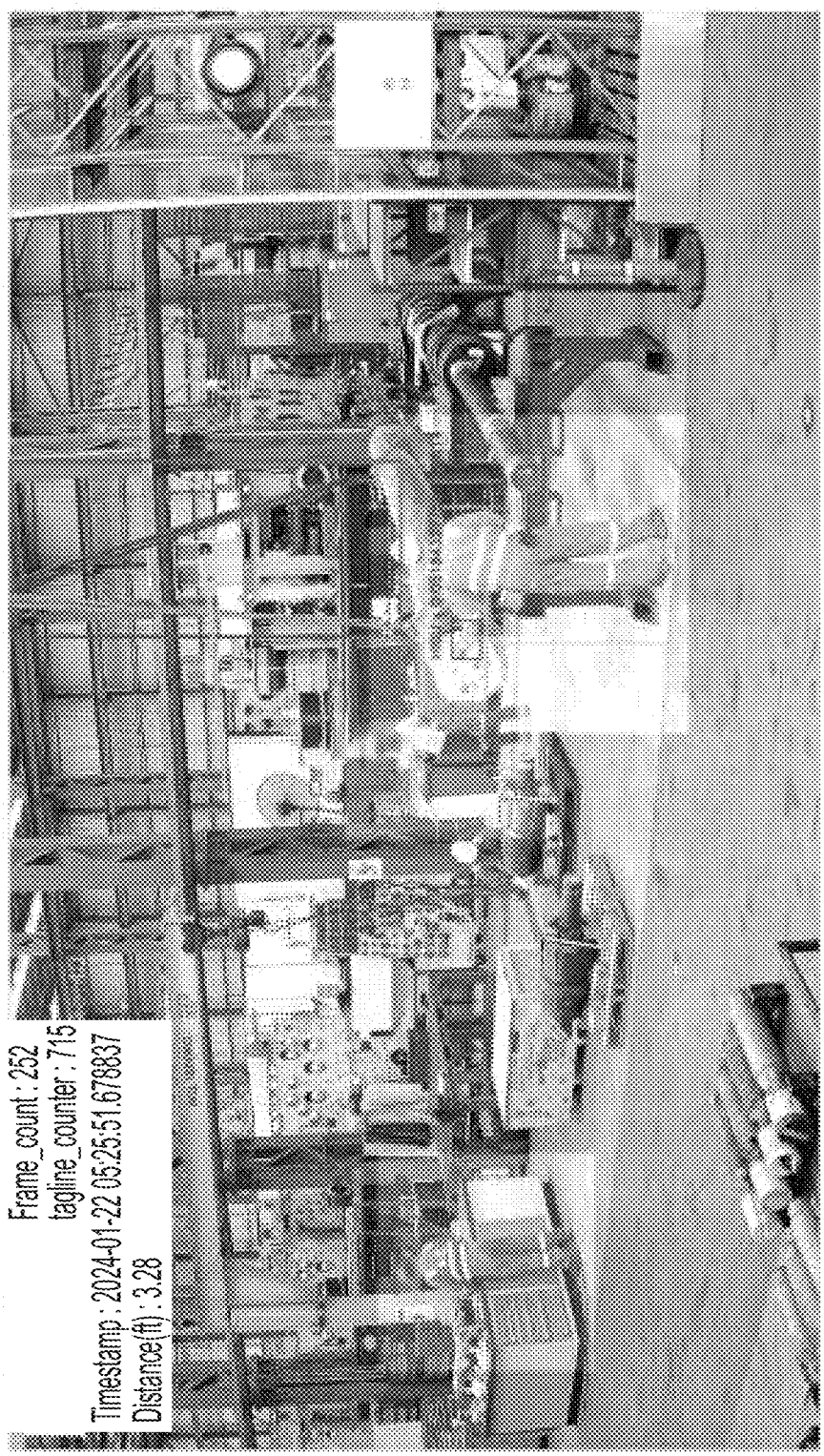
FIG. 3K is a photographic representation of a non-compliant tagline event.

Referring now to FIG. 3K, shown is an example in which a system and method in accordance with embodiments of the present disclosure identify inappropriate mechanical lifting by identifying that the person whose gloves are within the digital box is directly touching the equipment being lifted which is not appropriate according to the shop health and safety procedures. In one embodiment, a health and safety procedure is automatically enforced using collected and analyzed visual data. For example, a procedure—including the steps of (a) a load should be moved with a double sling support with a minimum angle, (b) the load should not be touched directly with hands, (c) a tagline should be used, and (d) other than the person(s) moving the load, no one else should be to close to the load—is automatically monitored for safety and KPIs.

Figure 3L:
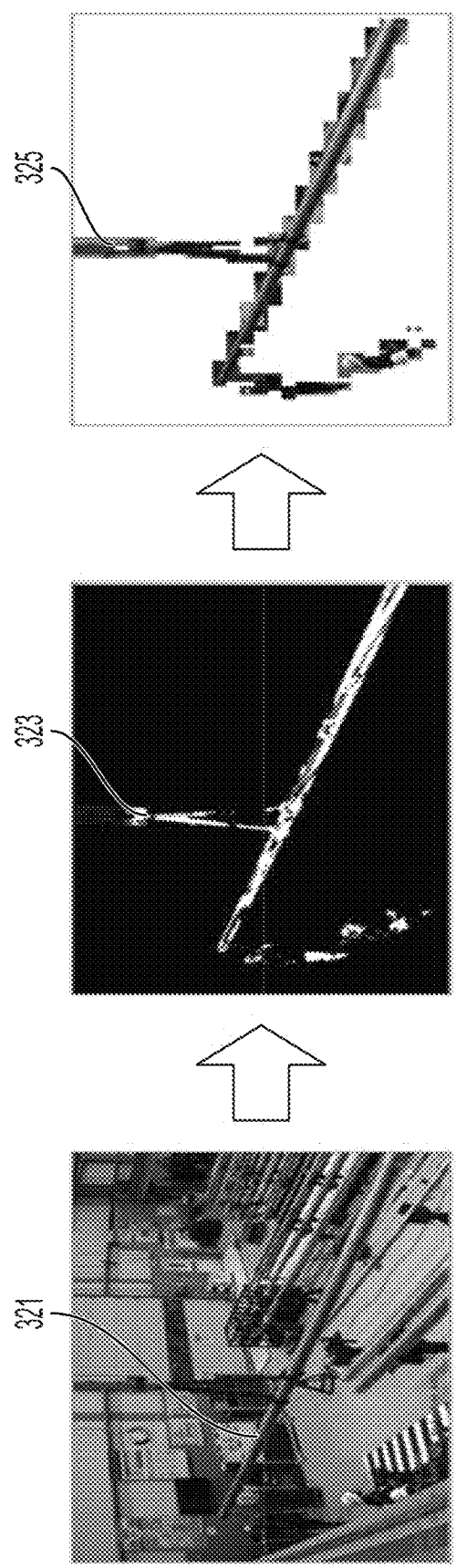
FIG. 3L is a photographic representation of extracting pixel blobs where lifting activity is happening.

Referring now to FIG. 3L, to identify possibly non-compliant mechanical lifting, in one embodiment, live video images 321 undergo pre-processing in which scene subtraction and vicinity-based evaluation detects that an activity is happening. In scene subtraction, the static background is isolated from the actual activity using conventional methods that output pixels 323 that are dynamic in nature. Using the positions of the dynamic pixels and the pixels in the vicinity of the pixels in previous frames, pixel blobs 325 are extracted where the activity is happening. The pixel blobs 325 are plotted on a white image frame as an intermediate frame as shown in FIG. 3L.

Figure 3M:
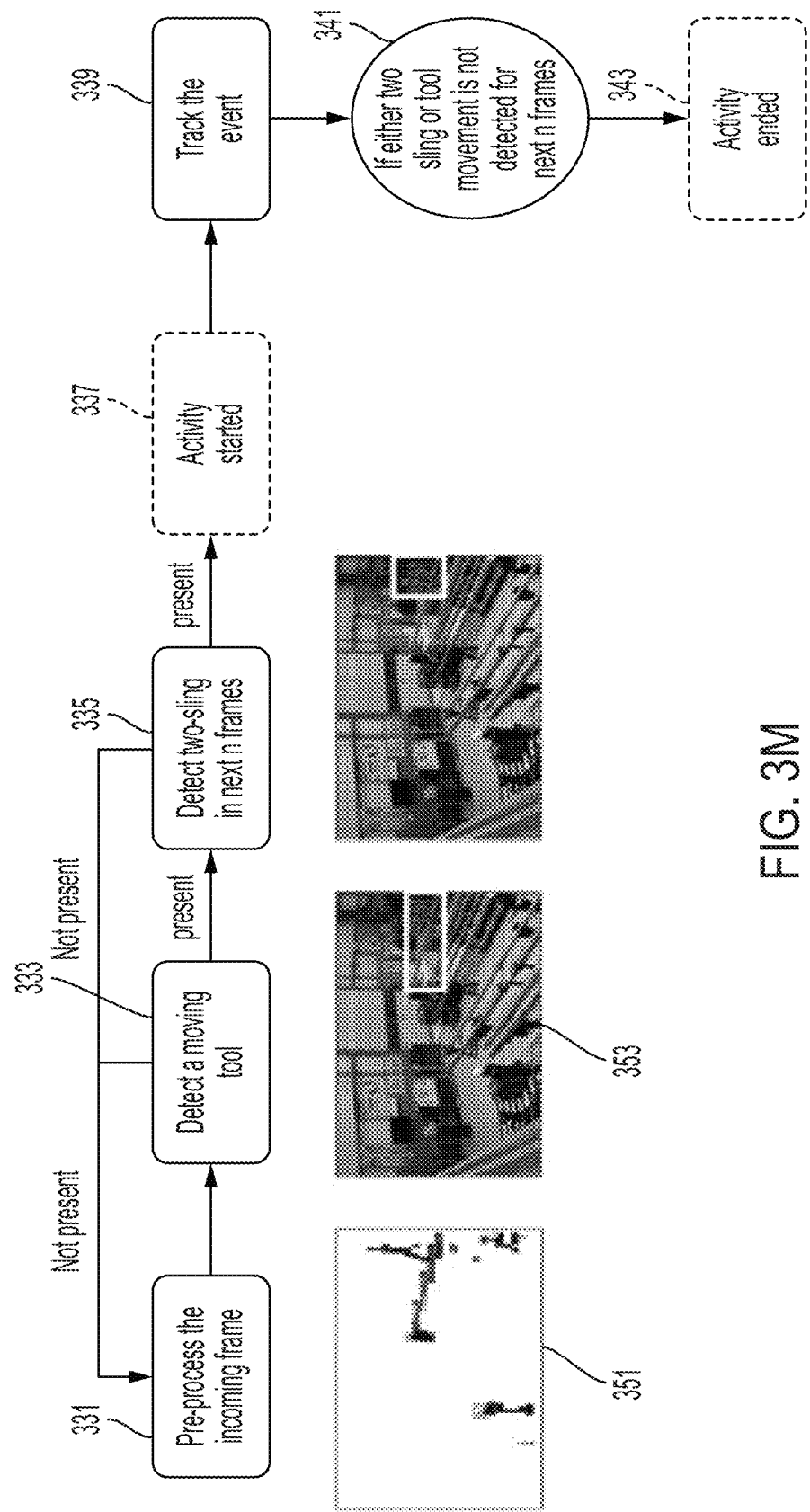
FIG. 3M is a flowchart of a system and method in accordance with embodiments of the present disclosure for automatically detecting a lifting event.

Referring now to FIG. 3M, shown is a flowchart of the steps the automated process takes when tracking a tool that is moved with the assistance of a sling. The automated process pre-processes 331 an incoming video frame, and detects 333 a moving from a background subtracted frame. The process detects 335 at least one sling. If, during the duration of the video, both the tool and at least one sling are present, an overlap between the bounding boxes of the tool and sling are checked. When the overlap surpasses a threshold value, for example, but not limited to, 25%, the system records 337 an event start time and tracks 339 the event. The system records 343 an event end time when 341 the sling or the tool is not detected for a pre-selected number of frames. The start and end times of the event are stored, for example, but not limited to, in CSV format. The system and method continuously monitor stored event information. If any new events are recorded, the system and method download and store the video of the events according to the recorded start and end times. The system and method in accordance with embodiments of the present disclosure check for non-compliance events in the event video. The system and method then perform a compliance check on the chosen frames in the event video. The presence of the tool and sling are verified. If the overlap between the bounding boxes of the tool and sling exceeds the pre-selected threshold, the frame is then subjected to person detection within a defined boundary. If there are individuals present, each cropped person with some padding around the bounding box is subjected to tagline detection. Upon detecting a tagline, a tagline counter is incremented. If the counter surpasses a pre-selected tagline counter threshold value, the system and method cease the compliance check, considering the person compliant due to the presence of a tagline. If the tagline counter does not reach the threshold, hand non-compliance is checked for.

Continuing to refer to FIG. 3M, if the person's hand is present in the video, the system and method check for an overlap between a hand bounding box and a segmented tool area. If the overlapping area is greater than the pre-selected overlap threshold, a redzone event is initiated. In one embodiment, event video is traversed twice, once when the frames are monitored for a previous threshold number of occurrences, such as, for example, but not limited to, 25, and once if the redzone event happens for more than 5 frames. Certain artifacts for the tentative redzone event such as, for example, but not limited to, current time, past time threshold, future time threshold are saved, for example, but not limited to, in a library. In the first check, sling detections are saved in storage, for example, but not limited to, a library to be used in a second iteration. For each red zone event, the displacement of the sling is checked using the stored time thresholds. If the sling has moved more than a threshold displacement value, the red zone is deemed to be valid. If the sling has not moved more than the threshold displacement value, the red zone event is deemed invalid. The system and method create a video for each valid red zone per mechanical lifting event.

Figure 3N:
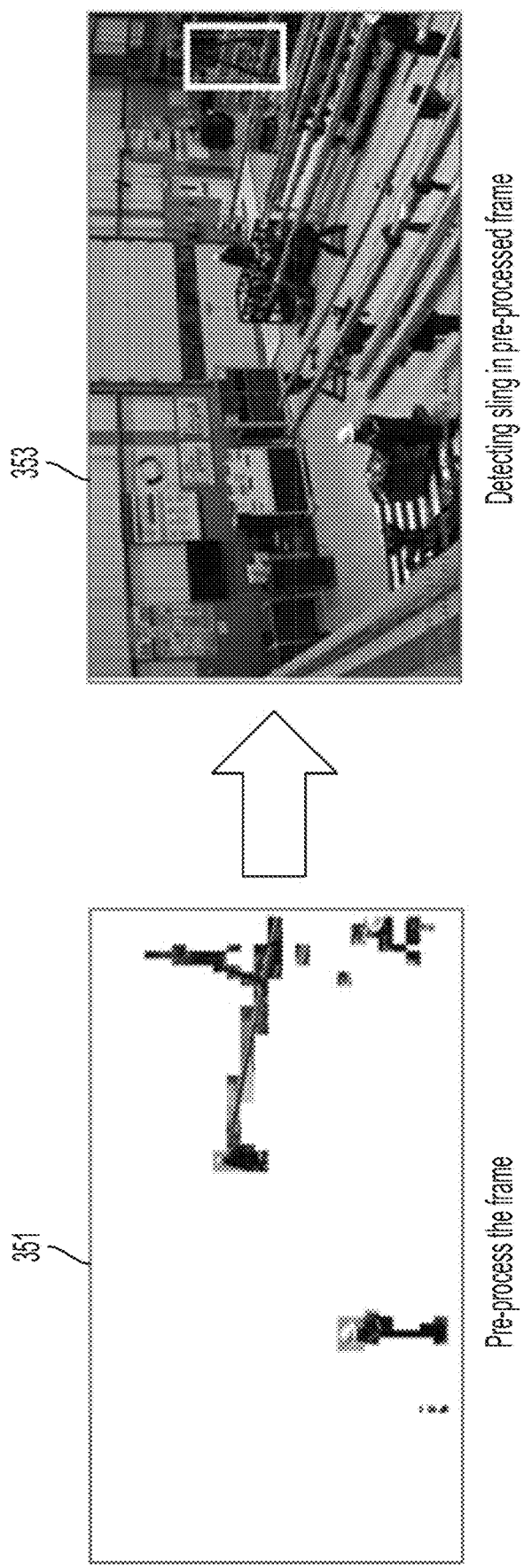
FIG. 3N is a photographic representation of tool detection.
Figure 30:

Referring now to FIG. 3N, to automatically locate tools in the workshop, the system and method use an object detection model to place bounding boxes around tools in a workshop area 353. To obtain the location of the tool within the bounding box, the system and method in accordance with embodiments of the present disclosure, determine, between the two diagonals in the bounding box, which diagonal represents the orientation of the tool. The tool is oriented along the diagonal that has the higher of the two counts of dynamic pixels. Further, when a large tool is moved, two slings are tied to the tool and to a crane hook to lift the tool. To check for a non-compliance event, the system and method determine if two slings are correctly being used to move the tool. Scene subtraction and vicinity-based pre-processing isolate pixel blobs 351 where there was any kind of movement happening, and those frames are saved. The presence and formation of double slings to move the tool are detected in the frames.

Figure 3P:
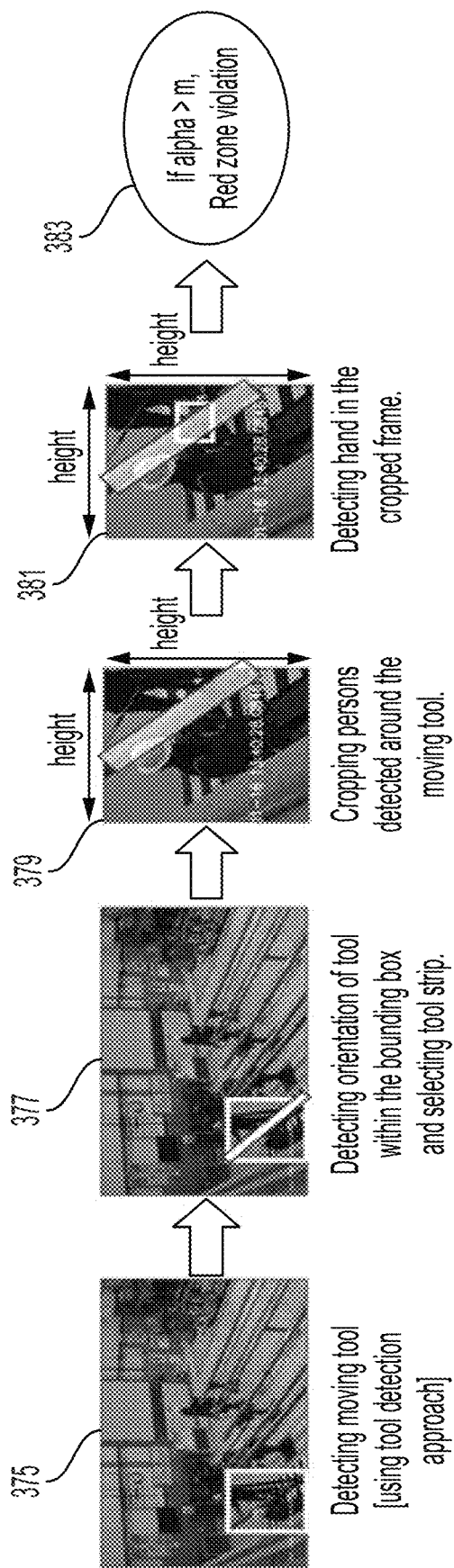
FIG. 3P is a flowchart of a method in accordance with embodiments of the present disclosure for automatically identifying when a person is placing a hand on a moving tool.
Figure 3Q:
FIG. 3Q is a photographic representation of identifying a tagline.

Referring now to FIGS. 3O and 3P, a worker is supposed to work on a tool if the tool is not moving. If a mechanical lifting event is taking place, no person should be working on the tool. The system and method in accordance with embodiments of the present disclosure automatically detect 375 (FIG. 3P) a moving tool, detect 377 (FIG. 3P) the orientation of the tool within the bounding box, check 379 (FIG. 3P) the incoming video for a person, and detect 381 (FIG. 3P) a hand on the tool or about to placed on the tool 373 (FIG. 3O) in a bounding box 371 (FIG. 3O). If 383 a hand is detected around the tool such that an overlap ratio α is greater than a pre-selected amount, the lifting activity is automatically determined by the system and method to be red zone non-compliant, where α=intersection area of the tool and the hand/the area of the hand Referring now to FIG. 3Q, integral to safe mechanical lifting is the use of a tagline 361. In one embodiment, to assess safety compliance, automated tagline detection is used. During a mechanical lifting event, a tool requires directional supervision while it is moving. These supervisions are done by a person using a tagline 361. In one embodiment, an automated method is used to check if a person in the vicinity of moving tool is using a tagline 361 to move the tool or not. In one embodiment, a person detection model detects the person using the tagline 361, and a tagline detection model in accordance with embodiments of the present disclosure is used to check for the tagline 361 in the hands of the detected person. If the detected person is not using a tagline 361 to direct the tool, a tagline non-compliance flag is raised.

Figure 3R:
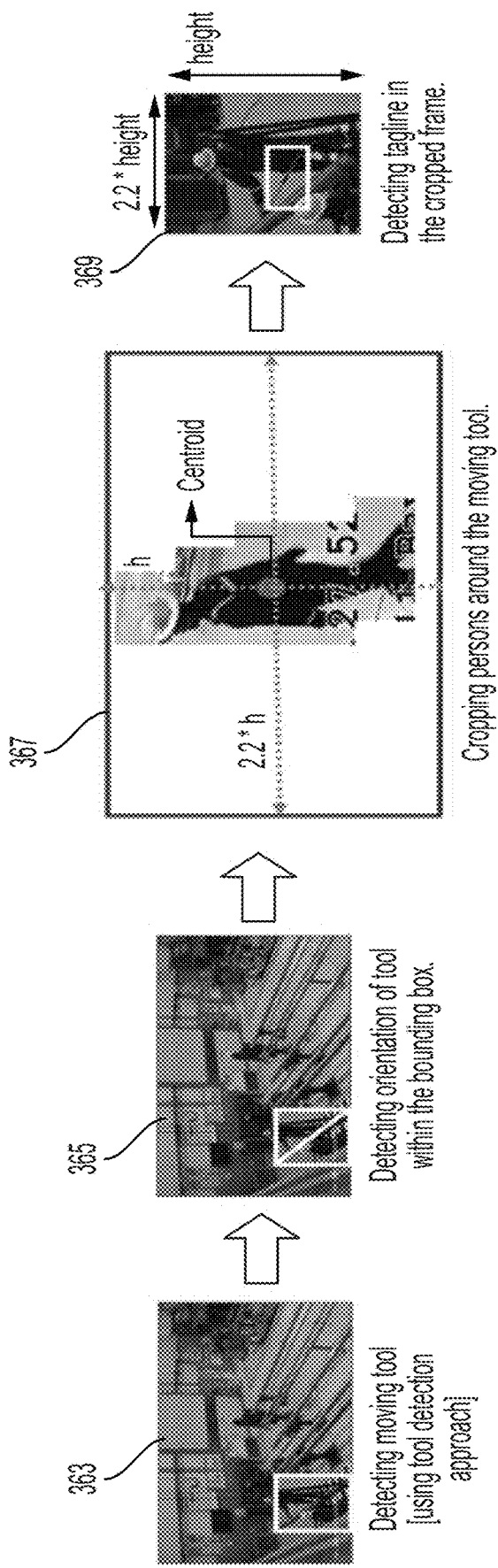
FIG. 3R is a flowchart for a method in accordance with embodiments of the present disclosure for automatically identifying a tagline in a cropped image.

Referring now to FIG. 3R, the automated method includes detecting 363 a moving tool and surrounding it with a bounding box, detecting 365 the orientation of the tool within the bounding box, cropping 367 the persons around the tool, and detecting 369 a tagline within the cropped frame. In one embodiment, a training dataset is prepared to enable tagline detection. The method for creating the training dataset includes extracting cropped person boxes in which the tagline is present and can be annotated. In one embodiment, a labeling data annotation tool is used for bounding box creation. The method includes training a model such as, for example, but not limited to, a tiny YOLO model, using files generated by the labeling annotation tool.

Referring now to FIG. 4A, in a workshop setting, compact tools are typically stored in wooden crates and relocated using forklifts. However, the movement of forklifts poses a potential hazard, especially when they are navigating at specific speeds near individuals in walkways. The system and method in accordance with embodiments of the present disclosure establish a dynamic unsafe zone around the active forklift, and monitor the presence of workers in close proximity to the moving vehicle to prevent accidents. Other types of moving vehicles besides forklifts are contemplated to be monitored by the present disclosure. A forklift is simply an example of a moving vehicle used in a workshop setting. The system and method automatically detect forklift (vehicle) movement, and selectively monitor vehicles that are actively in motion and surpass a pre-selected speed threshold. The system and method automatically establish a dynamic unsafe zone around the vehicle, contingent upon the direction of motion of the vehicle.

Continuing to refer to FIG. 4A, in one embodiment, the system and method use lights generated by the vehicle to dynamically define an unsafe region around the moving vehicle. For example, a forklift includes red laser lights that can be used to define the perimeter of the forklift. Other vehicles have other such features that can be used to define their perimeters. Two red laser lines 1011 encircling the forklift delineate the hazardous area. The system and method process the image of the forklift and laser lines to derive the unsafe region. The processing steps include, but are not limited to including, automatically extracting a range of color to build contours, automatically interpolating a line in each of the contours, and determining the vertices of the polygon region around the forklift. To extract the range of color to build contours, a color range of the relatively high intensity laser lights is chosen by converting the image channels of the incoming image data from RGB to HSV, determining ranges for the hue, saturation, and value channels, obtaining a mask for the regions where the laser lights are present, applying dilation to transform small blobs into larger contours, and outlining one edge 1013 of a parallelogram boundary.

Figure 4B:
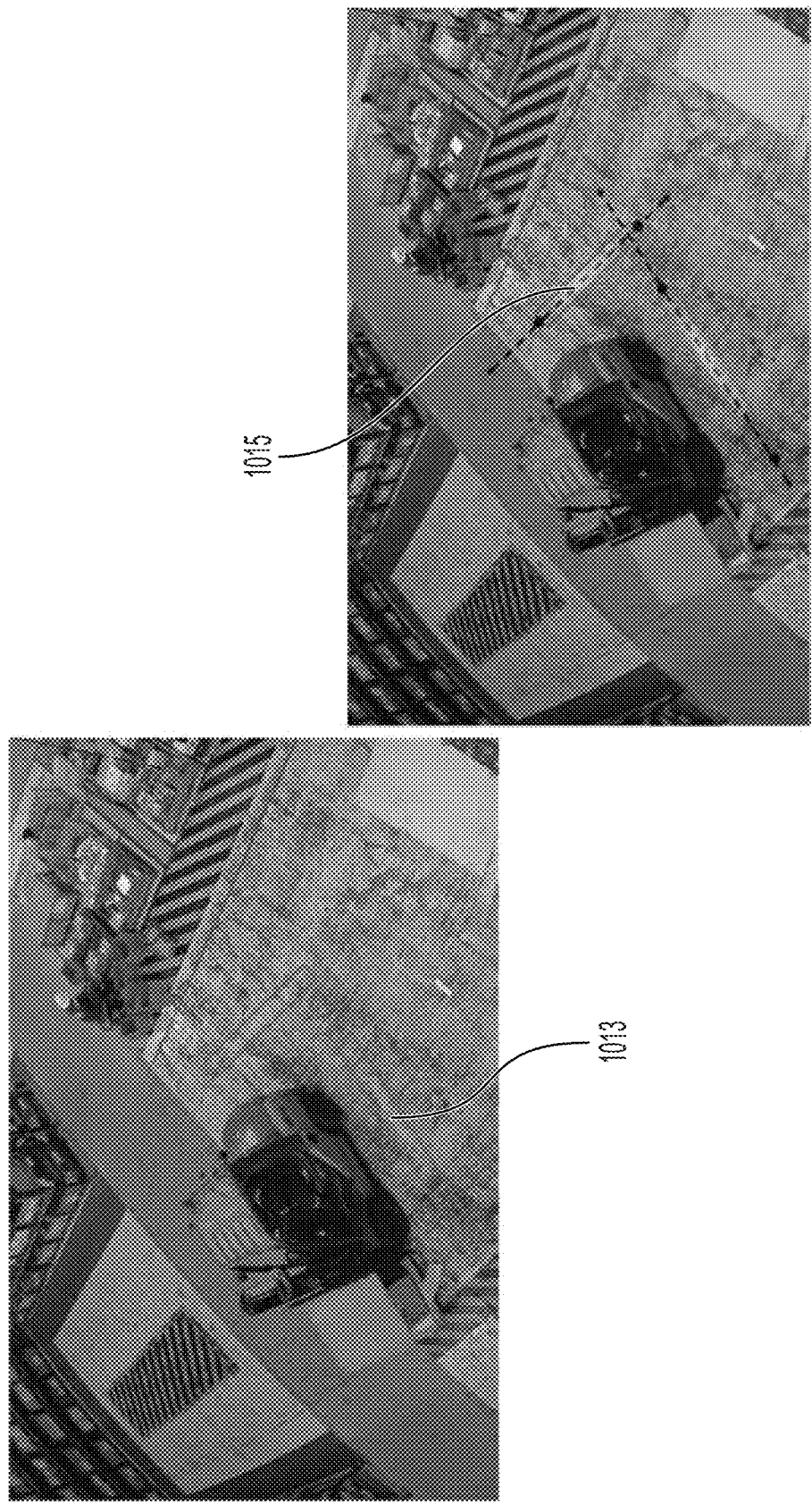
FIG. 4B is a photographic representation of the boundaries of a moving vehicle.

Referring now to FIG. 4B, the method includes, after identifying the contours, with each contour signifying one side of the laser, locating two points along the boundary of the contour that yield a maximum cross-sectional distance.

The method further includes, using these two points, interpolating a line 1015 that represents the corresponding side of a defined region. The method includes repeating the process of the other contours, resulting in the derivation of the line equations for each side of the region represented by the laser contours. The equations for the two laser lines 1015 are y=$m_1$x+$C_1$ and y=$m_2$x+$C_2$ where the two points ($x_1$, $y_1$) and ($x_2$, $y_2$) are the farthest two points on the cross section of contour and $$\text{Gradient}(m) = \frac{y_2 - y_1}{x_2 - x_1}$$

$$y \text{ intercept}(c) = y_1 - \frac{y_2 - y_1}{x_2 - x_1} * x_1$$

Figure 4C:
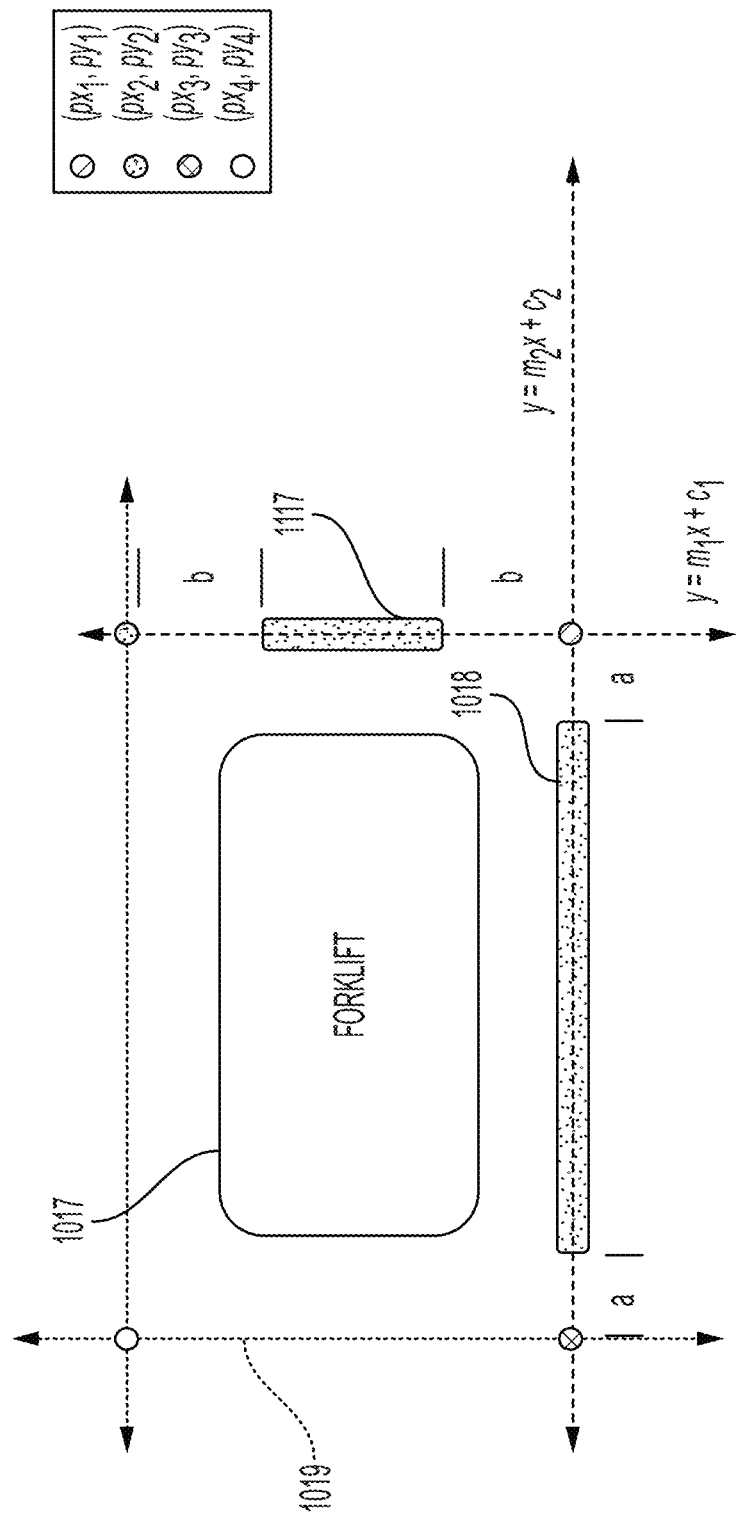
FIG. 4C is a graphical representation of a method in accordance with embodiments of the present disclosure for automatically identifying a polygon surrounding a vehicle based on lighted areas near the vehicle.

Referring now to FIGS. 4C and 4D, determining the vertices of the polygon region around the vehicle 1017 (FIG. 4C) when only two lighted sides 1117, 1018 (FIG. 4C) are present includes determining the intersection of the two lines and considering this point as one vertex of a polygon region. The method includes calculating the intersection point of two lines y=$m_1$x+$c_1$ and y=$m_2$x+$C_2$ as a first red zone coordinate ($px_1$, $py_1$). The method further includes calculating the distance of nearest end points of respective blobs from the first coordinate and find the coordinates that have same distance from other end of respective blobs, and that also lie on the same line to determine second and third coordinates as ($px_2$, $py_2$) and ($px_3$, $py_3$). The method further includes interpolating a line y=$m_1$x+$C_3$ passing through ($px_3$, $py_3$) with slope $m_1$ and a line y=$m_2$x+$C_4$ passing through ($px_2$, $py_2$) having the slope $m_2$. The method includes using the line equations to calculate the intersection point of the two lines and consider it as the fourth red zone coordinate ($px_4$, $py_4$), and the four points of the parallelogram 1019 (FIG. 4C). Using these points, an unsafe region 1023 (FIG. 4D) around the vehicle 1021 (FIG. 4D) and using a person detection model, it can be automatically determined if any person is in the vicinity of the vehicle when it is moving.

Figure 4E:
FIG. 4E is a photographic representation of an unsafe region around a moving vehicle based on persons in the vicinity of the moving vehicle.

Referring now to FIG. 4E in another embodiment, the system and method in accordance with embodiments of the present disclosure outline a hazardous area around a person's feet and assesses whether the moving vehicle 1025 is close to the person. Specifically, the system and method detect the speed and direction of the moving vehicle 1025 and dynamically define an unsafe region 1027 around the moving vehicle 1025. The system and method use an object detection model to detect people, and define an unsafe region 1027 around the feet of the people. The system and method check the intersection 1028 between the unsafe region 1027 and moving vehicle 1025.

Continuing to refer to FIG. 4E, in one embodiment, scene subtraction is used to distinguish moving objects from stationary ones. The output of the scene subtraction process serves as a mask, which is applied to the original frame, effectively eliminating static objects and focusing the detection on moving vehicles. In one embodiment, a pre-trained YOLOv5 object detection model is used to identify vehicles in images processed through scene subtraction. In certain scenarios, when a vehicle transitions from a moving state to a static state, there is a saturation time in scene subtraction. During this period, the output mask may include static vehicles. To address this challenge, the system and method track the vehicle's movement by assessing the absolute displacement of the vehicle in each frame. If the absolute displacement surpasses a pre-selected threshold, the vehicle is characterized as moving. The absolute displacement is calculated based on the change in the centroid point's position across consecutive frames. If the centroid of vehicle in frame t is ($x_t$, $y_t$) and the centroid of the same forklift in frame t+1 is ($x_{t+1}$, $y_{t+1}$). The pixel displacement is d= $\sqrt{(x_{t+1}-x_t)^2+(y_{t+1}-y_t)^2}$ which incorporates the camera's perspective bias. The absolute displacement D is calculated by mapping the pixel displacement d to the actual displacement using the height h of the vehicle as a reference.

$$D = \frac{d * h}{(yf_2 - yf_1)}$$

where the coordinates of the vehicle bounding box are ($xf_1$, $yf_1$) and ($xf_2$, $yf_2$). The direction of the vehicle, is calculated as $$x_{dir} = x_{t+1} - x_t$$
$$y_{dir} = y_{t+1} - y_t$$

where ($x_{dir}$, $y_{dir}$) are the coordinate vectors.

Figure 4F:
FIG. 4F is a photographic representation of a walkway to accommodate moving vehicles in a workshop.

Referring now to FIG. 4F, because a workshop walkway facilitates bidirectional movement of vehicles in a linear manner, the system and method monitor vehicles 1025 moving within the directional scope of the walkway 1035 and situated on the walkway 1035. This subset of moving vehicles 1025 is automatically determined by examining the overlap between the masks of the vehicle and the walkway. If there is an overlap, the vehicle is characterized as positioned on the walkway. Upon determining the direction in which the vehicle is moving, the portion of the vehicle that is designated as the unsafe region is determined, based on the direction 1033 the vehicle 1025 is moving. A mask 1031 representing the unsafe region is created.

Figure 4G:
FIG. 4G is a photographic representation of an unsafe region around a moving vehicle based on persons in the vicinity of the moving vehicle.

Referring now to FIG. 4G, in another embodiment, the system and method establish an unsafe region based upon the presence and location of workers in proximity to the moving vehicle. By employing an object detection model that has been trained, the system and method automatically identify individuals within the original incoming data frames. The object detection model can include, but is not limited to including, a YOLOv5 model. When the individuals are detected, the system and method automatically estimate the location of their feet. To define the unsafe region around the feet of each person after the person is in the frame, the method assumes that the feet of person are the lowest point of the person on the y axis, and across the x axis, the feet are in the middle. Using these assumptions and the equation of ellipse, the system and method automatically build an elliptical mask around the feet of each person. The following equation defines the red zone around the feet of the person.

$$\frac{\left(x - \frac{x_1 + x_2}{2}\right)^2}{a^2} + \frac{(y - y_2)^2}{b^2} = 1$$

here ($x_1$, $y_1$) and ($x_2$, $y_2$) are the coordinates of the person's bounding box, and a and b are the hyperparameters such that the major axis of ellipse is 2a and the minor axis of ellipse is 2b. The feet of the person are at $$\left(\frac{x_1 + x_2}{2}, y_2\right).$$

In one embodiment, combining the cumulative mask of the unsafe region 1027 for each person and the mask outlining the unsafe region around the vehicle 1025, the intersection area between the two entities is calculated. If the intersection area exceeds a pre-selected threshold, the system and method automatically record a violation by the person currently in close proximity to the moving vehicle.

Figure 5A:
FIG. 5A is a photographic representation of person and hat detection.
Figure 5B:
FIG. 5B is a photographic representation object space expansion and blurring.

Referring now to FIGS. 5A and 5B, shown in FIG. 5A is an example of person and hat detection, and shown in FIG. 5B is an example of object space expansion and blurring. Anonymity in a video notification system makes the communication of risky events possible to ensure a safe working environment free from health hazards. The system and method in accordance with embodiments of the present disclosure automatically anonymize a video by blurring of workers appearing in the video clips of risky events. Effective and accurate anonymization systems and methods include accommodations for objects lost by automatic detection systems in 3-channel image inputs, objects lost by the object tracking systems in videos inputs, and spatial movement of objects in video frames due to frame processing constraints. The system and method automatically detect objects, in this case, people, track the people, detect objects related to the detected and tracked people, track the objects related to the detected and tracked people, expanding the space of the objects, determining object history from previous frames in the video, and blurring of detected, tracked, historical and expanded spaces of objects in images.

Figure 5C:
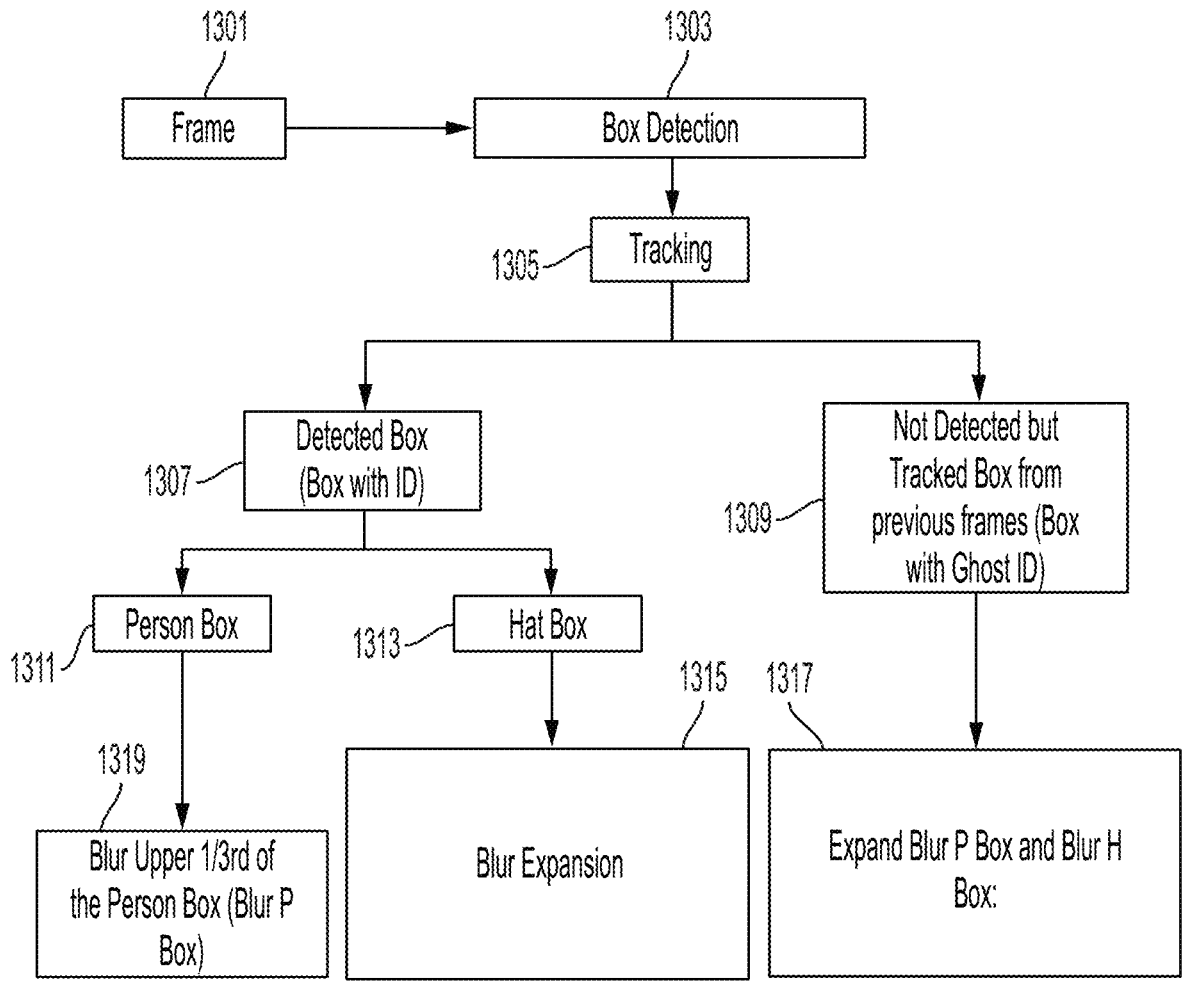
FIG. 5C is a flowchart of a method in accordance with embodiments of the present disclosure for blurring technician faces.

Referring now to FIG. 5C, with respect to blurring of a detected person's bounding box, the upper one third of the person box is blurred. With respect to blurring of a tracked person box, when a person present in the image is not recognized by the object detection model, the tracked box for the person is blurred. There is a chance that the person might have moved a small distance from their previous position in the image. Therefore, the upper one third of the bounding box is doubled in both x and y axes. This expanded region in the image is blurred.

With respect to blurring the hat bounding box, to ensure that the chances of blurring of the person is maximized, the detected hat box is used along with the person box. As in blurring the person's bounding box, the hat box is blurred differently in the two cases of detected hat box and tracked hat box. With respect to blurring of detected hat box, the detected hat box is expanded downwards to double the height of the box. This downward stretched hat box is blurred. With respect to blurring the tracked hat box, there is a possibility that the person might have moved from their original position. Therefore, the downward stretched hat box is expanded further in both x and y axes to twice its original length.

Continuing to refer to FIG. 5C, the system and method in accordance with embodiments of the present disclosure receive 1301 frames of data and detect 1303 bounding boxes in the data and track 1305 them. If there is a bounding box detected with identification 1307, and the bounding box is a person box 1311, the upper third of the person bounding box is blurred 1319. If the detected bounding box 1307 is a hat bounding box 1313, the blurring is expanded 1315 into the hat bounding box. If the tracking 1305 does not detect a bounding box, but there is a bounding box from previous frames 1309, the blur in the person bounding box and the hat bounding box are expanded 1317. This method detects and blurs related objects usually seen together. In this example, using the safety-hat along with the person object detection minimizes the chances of missing the person. The method applies the blurring of object spaces from multiple frames to blur a single frame, and enlarges the region of blurring to include area around detected space to account for object movement.

Figure 6A:
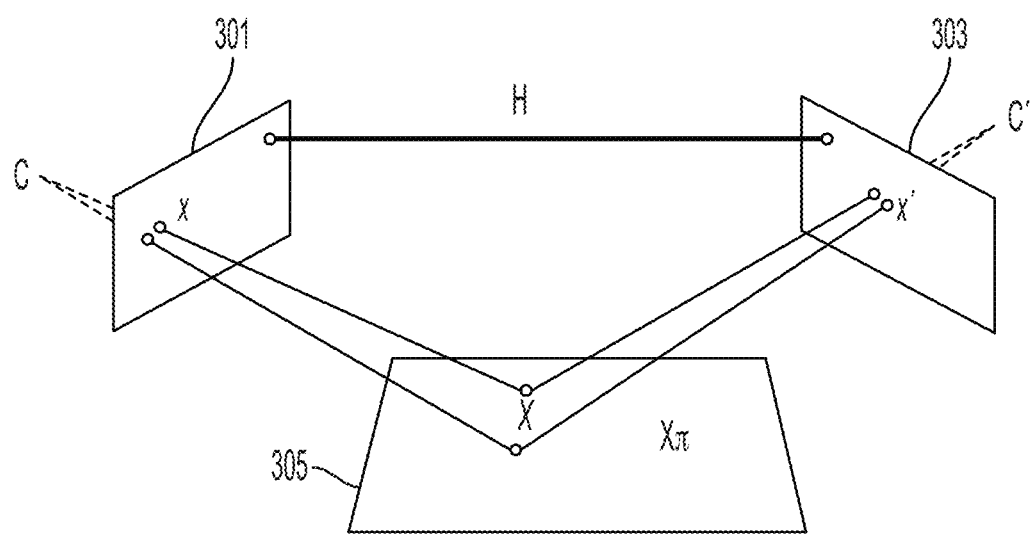
FIG. 6A is a pictorial representation of a 2D homographic method in accordance with embodiments of the present disclosure.

Referring now to FIG. 6A, workshop efficiency can be optimized by monitoring space occupancy for assets and tracking technician allocation to ensure timely completion of tasks. Resource management can be improved by assessing the number of technicians and person-hours dedicated to each asset. Object detection models can provide the number of technicians in a particular frame. What is further needed is to identify unique individuals who occupy a space over a period of time without using facial recognition. The system and method in accordance with embodiments of the present disclosure track a person in a region across multiple camera views. The system and method perform a 2D projection to transform the position of person detected on camera image to its corresponding position on the floor map. Homography describes the projective geometry of two cameras and a world plane, i.e. homography maps images of points which lie on a world plane from one camera view to another. In one embodiment, point correspondences are used to calculate homography Point correspondences are a pair of corresponding points (x, x') in the two camera views 301, 303. In one embodiment, the point correspondences are used to compute a mapping that is used to calculate correspondences for other points lying on the world plane 305. A homographic transformation is represented as $$cx' = Hx$$

$$\text{where } x = \begin{pmatrix} x \\ y \\ 1 \end{pmatrix} \text{ and } x' = \begin{pmatrix} u \\ v \\ 1 \end{pmatrix}$$

where c is the projection of the intersection of points x and x' from the world plane 305 through the camera views 301 (x) and 303 (x') respectively, and H is the distance between the two camera views 301, 303. A minimum of four points is needed to solve for eight unknowns since each point has x and y coordinates.

Figure 6B:
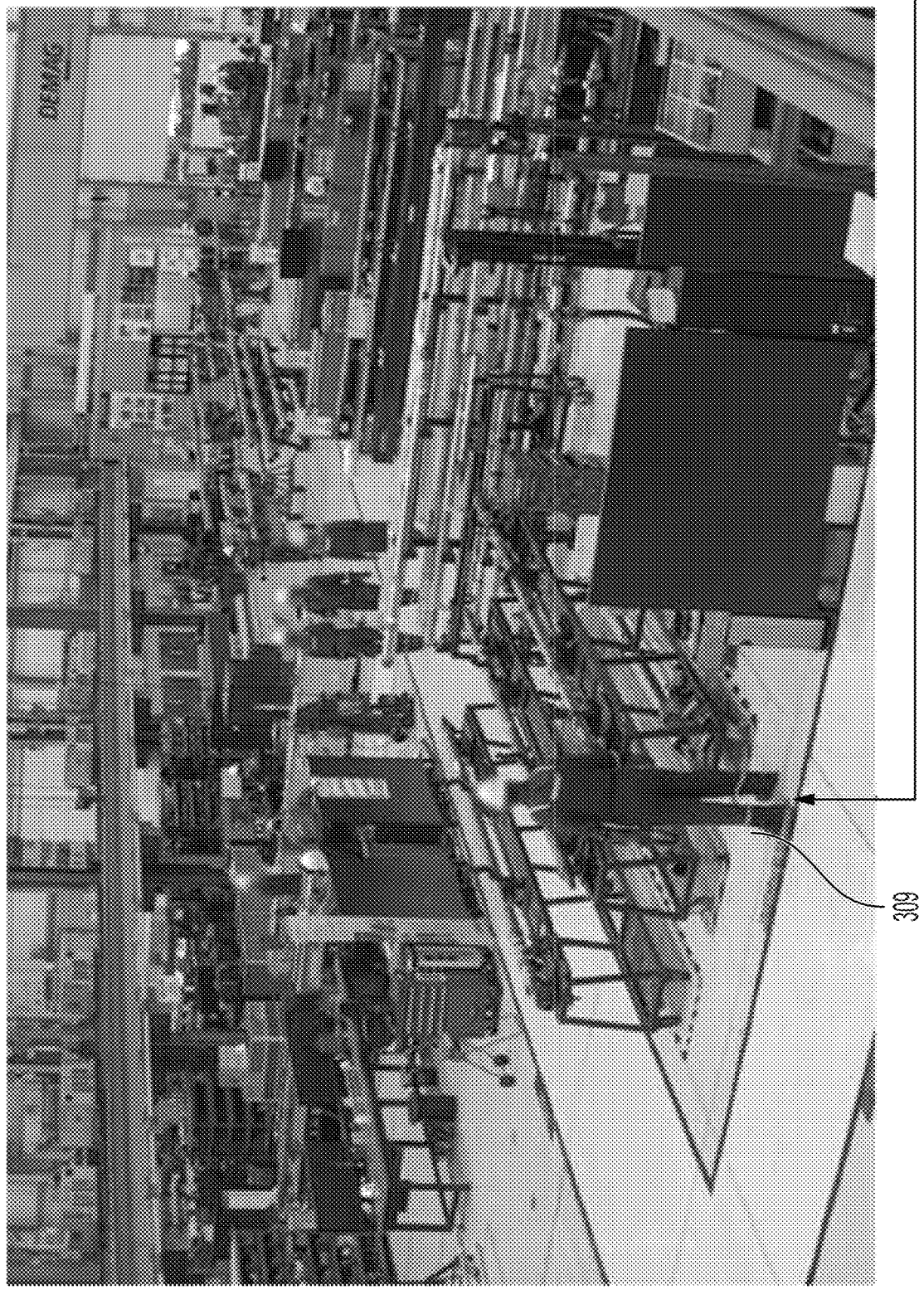
FIGS. 6B and 6B continued are a photographic representations of locating a resource on a floor map.
Figure 6B:
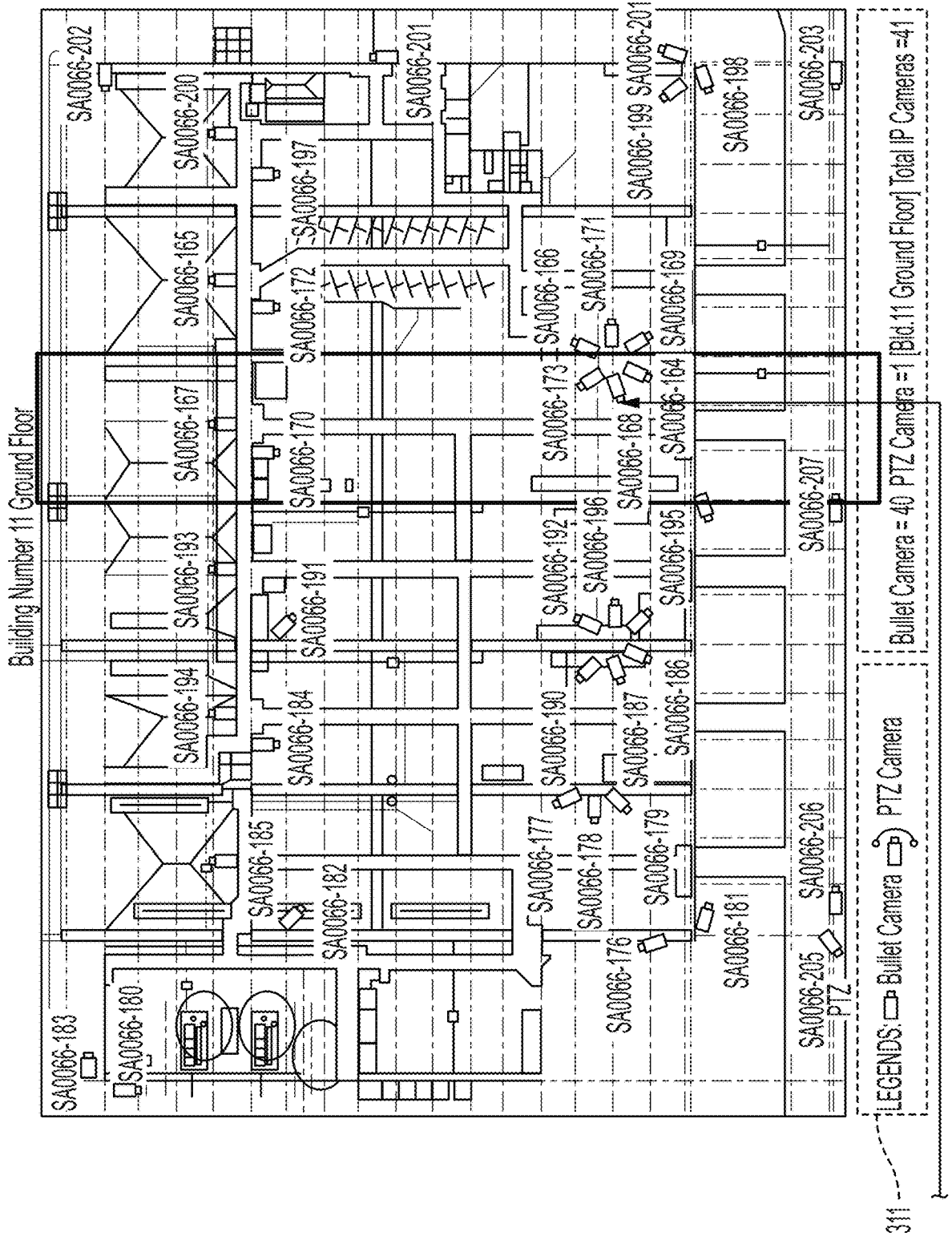
Figure 6C:
FIG. 6C is a photographic representation of tracking tool on bench time on a workshop floor.
Figure 6D:
FIG. 6D is a photographic representation of tracking bench utilization on a workshop floor.
Figure 6E:
FIG. 6E is a photographic representation of tracking data entry time on a workshop floor.
Figure 6F:
FIG. 6F is a photographic representation tracking wrench time on a workshop floor.

Referring now to FIG. 6B and FIG. 6B continued, the system and method tracks people by accepting bounding box coordinates and computing centroids, computing the Euclidean distance between the centroid of the bounding boxes, and identifying coordinates, updating (x, y)-coordinates of existing identifications 309 based on distance, registering and deregistering persons, accepting bounding box coordinates, computing the position of the person's feet, and plotting them on 2D map 311 using 2D projection, computing the Euclidean distance between new bounding boxes and existing identifications (each identification has a past counter attached), applying a greedy approach for selecting a minimum distant identification, and determining whether the minimum identification distance for each person lies within a pre-selected range. If the minimum identification lies within the pre-selected range, the system and method update (x, y)-coordinates of the existing identification, and reset a past counter associated with the existing identification. If the minimum identification does not lie within the pre-selected range, the system and method increment the past counter if the past counter has not reached an absence threshold, or if the past count has reached an absence threshold, deregister the person. The system and method include registering new identifications along with their past counter. If any person identification is missing, the system and method increase the past counter if the past counter did not reach threshold, or otherwise the system and method deregister the person.

Continuing to refer to FIG. 6B and FIG. 6B continued, the system and method detect assets and aggregate people count by using trained object detection models to detect assets. The people count is aggregated and stored over a pre-selected amount of time, for example, but not limited to, over one minute. The number of technicians in a region over a different period of time from the pre-selected amount of time is predicted using the minute-level person count. With these computations, technician count and technician hours metrics for assets and workstations can be predicted.

Figure 6G:
FIG. 6G is a photographic representation of tracking technician hours on a workshop floor.

Referring now to FIGS. 6C-6G, tracking various types of data enables productivity tracking on the shop floor using KPI integration. Any or all of the following or other metrics can also be tracked: the length of time a tool spends on a bench or in a location (see FIG. 6C), how much each bench or location is being utilized (FIG. 6D), how much time is being devoted to data entry (FIG. 6E), and activities such as wrench time (FIG. 6F) and technician hours (FIG. 6G). All of these data provide a clear perspective of shop productivity.

Figure 6H:
FIG. 6H is a photographic representation of locating the technicians in a workshop area.
Figure 61:
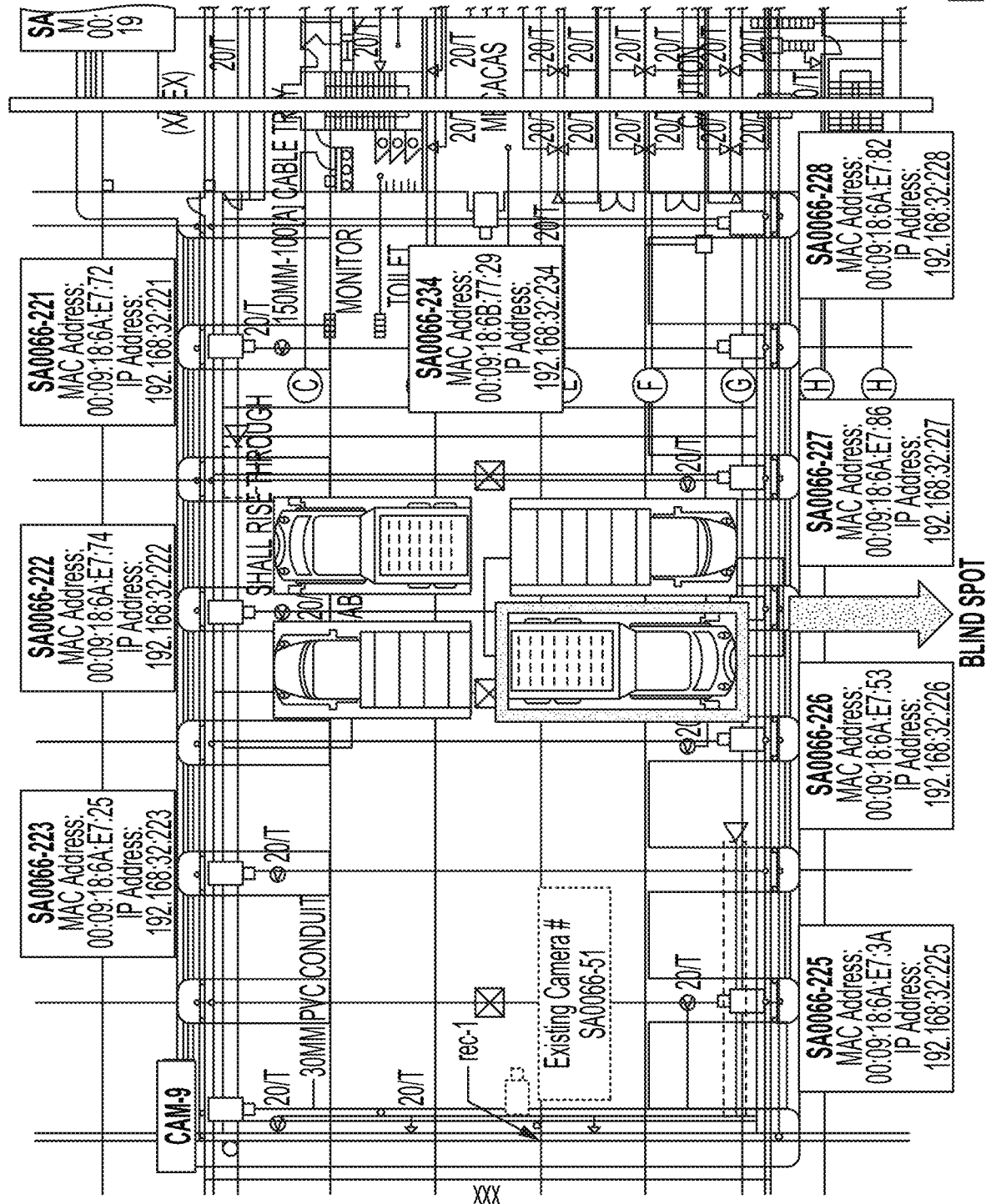

Referring now to FIG. 6H, the knowledge of number of technicians working on each asset inside a workshop, and the corresponding person hours of work completed on the same can improve resource allocation. The system and method in accordance with embodiments of the present disclosure provide a transfer learning-based approach to identify assets in each bay of a workshop and calculate the technician hours. These metrics can help a business plan its maintenance activities dynamically and efficiently.

Figure 6J:
FIG. 6J is a photographic representation of quadrant division for counting technicians in the workshop area.
Figure 6K:
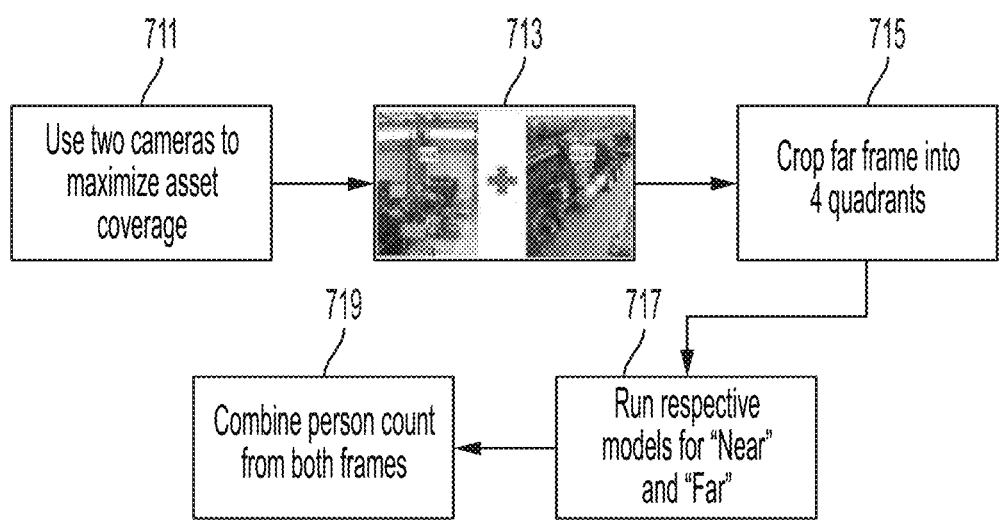
FIG. 6K is a flowchart of the method for combining technician counts from two cameras.

Referring now to FIGS. 6I-6K, camera placement inside a workshop produces blind spots making technician count difficult to measure. Placing a camera at a pre-selected position in the bay captures people working on the blind spot of the asset. The technical solution includes, but is not limited to including, using two cameras 711 (FIG. 6K) to maximize coverage, taking a frame 713 (FIG. 6K) from each of the cameras, and dividing 715 (FIG. 6K) the image into four quadrants, executing 717 (FIG. 6K) a person detection model in the top two quadrants providing a "far" people count for the blind spot, and a "near" people count derived from images using a normal setting on the front camera, and stitching 719 (FIG. 6K) the "near" and "far" persons detected to calculate the aggregated people count per workshop bay. Note that people are tracked as described elsewhere herein.

In one embodiment, the development of each use case is undertaken in seven stages. Each Stage (A-G) is described in more detail below.

At Stage A, every use case is broken down into smaller steps which can be mapped to a series of AI processes/concepts. These smaller steps are then developed individually using various AI processes. For example, the mechanical lifting process of FIG. 3 can be broken down into the following AI concepts: scene subtraction which includes moving objects (such as, for example, but not limited to, tools and personnel) detection, object detection which includes, for example, but not limited to, sling, tagline and personnel detection, object segmentation which includes, for example, but not limited to, tool and hand segmentation, and 2D projections which include, for example, but not limited to, mapping moving tools and personnel on the ground in a red zone.

In Stage B, vision analytics processes are developed using real time camera feeds. The analytics processes execute on the edge at a frame level or a small set of n frames. Some of these processes include wide angle camera screw correction, frame blur correction, for example, kernel convolution, object tracking for example, an n-frame process, scene subtraction, for example, averaging and/or a mixture of Gaussian and k nearest neighbor, object detection, for example, two-stage object detection such as R-CNN and faster R-CNN and/or one-stage object detection such as SSD, MobileNet, RetinaNet, YOLOR, YOLO vx, and YOLO vx-tiny, object segmentation for example, U-Net, Mask R-CNN, and Yolo V7 Segmentation, pose estimation, for example, kinematic pose estimation such as MoveNet, BlazePose, PoseNet, Lightweight and PoseNet, and optical character recognition, for example, TrOCR and Tesseract.

Stage C ensures that the final solution can be deployed on the edge, given the limited resources of time, accuracy, and compute resources. A lighter process results in a decrease of resource use (time and compute requirements). In one embodiment, the concept of AI-units is used for each core process. At a high level, the term "AI-units" is defined as a mapping for each process to its resource versus frame-per-second (FPS) mapping. To ensure that acceptable accuracy limits are retained, the total AI-Units of the use case is decreased by replacing heavier models by lighter (or edge) equivalent models, or the knowledge distillation process is used. Also, for processes that track events and require a threshold level of accuracy, for example, but not limited to, non-compliance detections, a two-step deployment technique is used. The first step is that a relatively lighter model to detect basic key events with a first threshold level of accuracy is executed for each frame, for example, detecting tool movement in mechanical lifting use case. The second step is that the relatively heavier model is executed when the relatively lighter model detects key events, for example, but not limited to, when a hand is placed on a tool or when the red zone is being mapped in a mechanical lifting use case. In one embodiment, the relatively heavier models are chosen from a queue which ensures that, even if use case events happen at the same time, the relatively heavier processes execute sequentially.

In Stage D, techniques are used to improve the frame level predictions from Stage C. In one embodiment, output filtration is used to remove false positive examples with combinations of predefined object metrics like aspect-ratio, intersection-over-union (IOU) and dice coefficient. For example, when a model misidentifies an object such as a person or a hat in an image, the object is removed by a predefined aspect ratio limit of a person box, ensuring the IOU for a correct hat box is >90% with respect to the person box. In one embodiment, slicing aided hyper-inferencing (SAHI) is used for cameras with a threshold level of coverage and resolution to ensure that objects that are a threshold distance from the camera are detected in the scene. In one embodiment, confluence is used for object detection processes where the same object types overlap in the scene, for example, as in a crowded workshop with many people. Other techniques to improve the relevant frame level predictions can also be used.

At Stage E, the output of the application is aggregated at various levels, for example, across different bays, floors, buildings, and locations. In stage E, the system and method ensure that the assets/objects of interest are not over or under counted, regardless of the number of cameras of when there are overlapping views at different heights and fields of view. Various techniques can be used to ensure correct and consistent results. In one embodiment, a 2D mapping technique is used to project camera viewpoints onto a 2D map of the location using homographic transformations.

In Stage F, the data from the vision process is massaged to improve its fidelity and accuracy. Data correction processes are executed over the past n time stamps using techniques such as, for example, but not limited to, removing random noisy data, for example, but not limited to, discrepancies in people counts between frames and/or between the count of people passing and the count of people working on assets. In one embodiment, a low pass filter and/or a time series filter is/are used to remove noisy data. In one embodiment, low pass filters such as, for example, but not limited to, a moving average filter for filtering the jitters in the raw data arising from, for example, the count of people in a bay and/or people passing workers handling tools, and a Fast Fourier Transform (FFT) using FFT convolution are used. In one embodiment, time series filters such as, for example, filters that identify trends, seasonality, and noise in the time-series data from the vision process, filters that detect anomalies/outliers that are used to identify correct data points out of the past data points, and filters that detect novelty that are used to identify an incoming data point as either an outlier or a correct data point. In one embodiment, the data from the vision process are processed remotely, for example, streamed to a cloud service, or locally.

In Stage G, the massaged vision data are provided to processes that determine KPIs from the data. The massaged frame level data are aggregated into minute level KPIs. The minute level KPIs are used to build the business KPIs. The minute level KPIs are determined using processes such as, for example, but not limited to, minute level aggregation, widow-based aggregation, max aggregation, and mode aggregation. In max aggregation, transactional data are converted into minute level data by determining the maximum value of the KPI across the records within a minute. In mode aggregation, transactional data are converted into a minute level data by determining the mode of value of the KPI across the records within a minute. In window-based aggregation, the state of a KPI can be changed based on a previous n frames.

In response to determining that a non-compliance event has occurred, the system generates an instruction to implement behavior to correct the safety non-compliance. For example, the technician's phone could sound an audible alarm to alert the technician that, for example, gloves are not worn or a hard hat is not worn. The technician could quickly come into compliance. In another example, the system could trigger workshop-wide alarms if a mechanical lifting non-compliance event has occurred. For example, if multiple technicians are inappropriately in a red zone, lights could flash in the workshop, and/or sirens could be activated.

In response to determining that the workshop activities have fallen below threshold values of key performance indicators, the system generates an instruction to address the performance issue. For example, if technicians are spending too much time in data entry, the system can alert management and provide the gathered statistics for further evaluation.

Figure 7A:
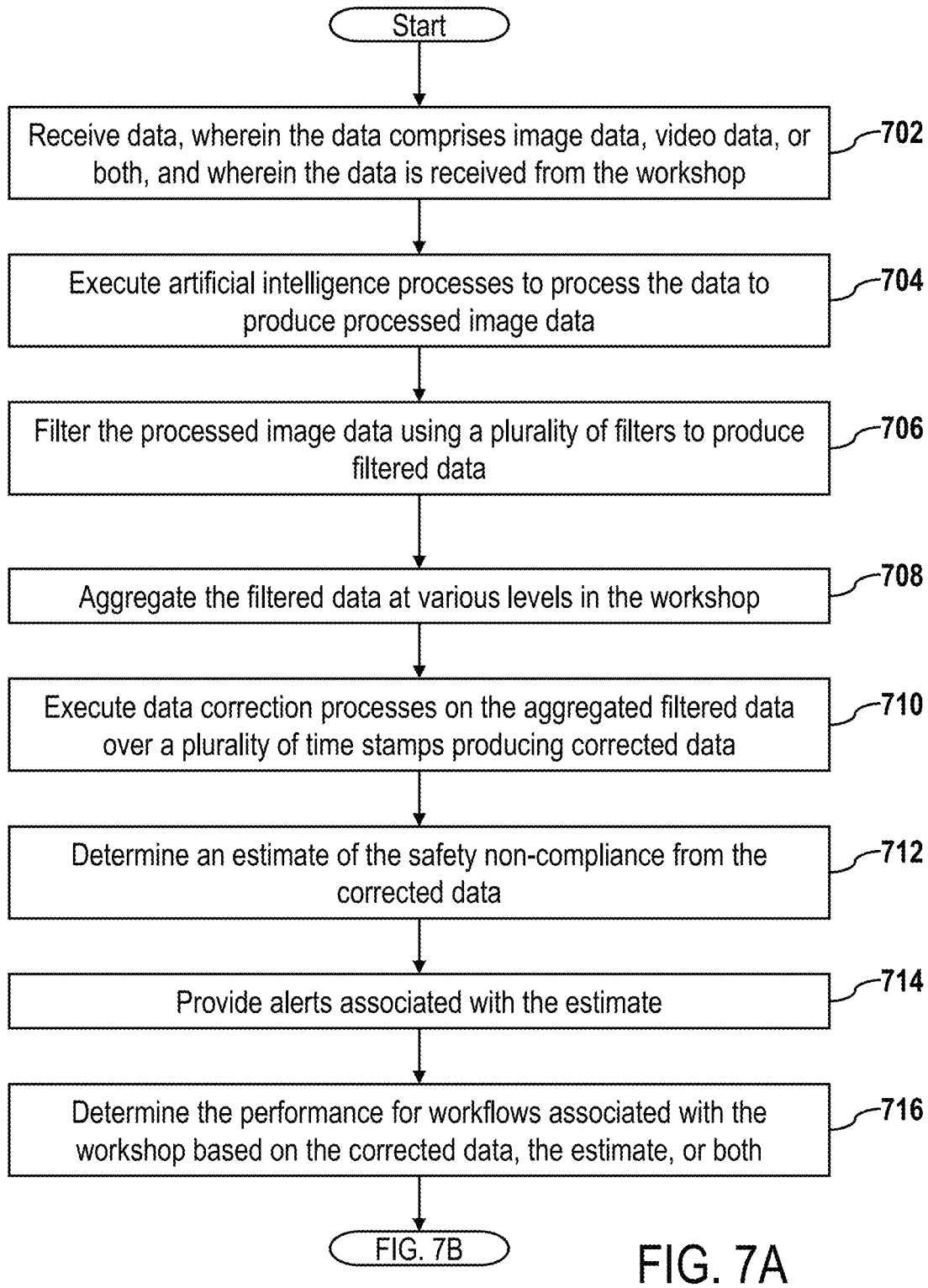
FIGS. 7A and 7B are a method in accordance with embodiments of the present disclosure for determining safety non-compliance and performance metrics for a workshop.
Figure 7B:
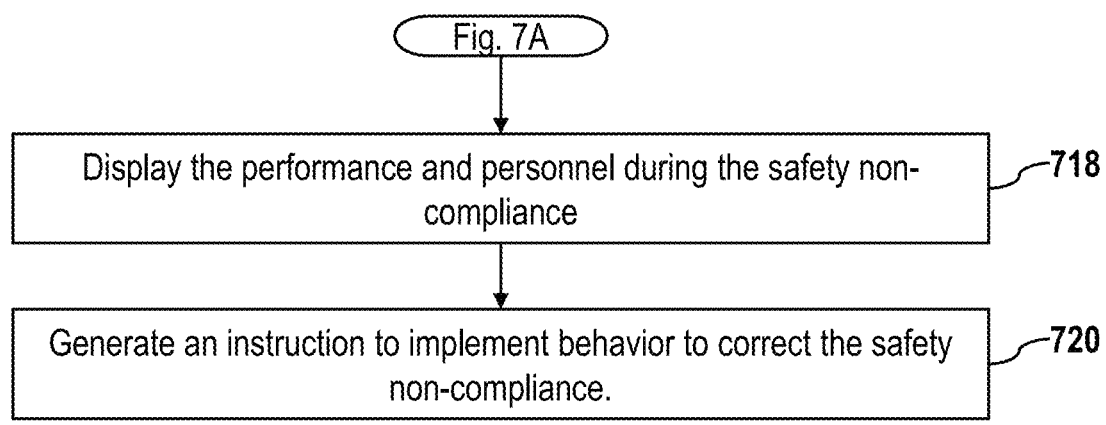

Referring now to FIGS. 7A and 7B, the method 700 for detecting safety non-compliance and monitoring performance in a workshop includes, but is not limited to including the steps of receiving 702 data, wherein the data comprises image data, video data, or both, and wherein the data is received from the workshop, wherein the data include images from use cases, wherein the use cases include personal protective equipment detection, tracking of personnel, workshop utilization, technician count, asset identification, mechanical lifting detection, tool detection, red zone detection, tagline detection, personnel anonymization, generic load detection, proximity to moving vehicle detection, and performance indicator determination.

The method 700 further includes executing 704 artificial intelligence processes to process the data to produce processed image data, wherein the artificial intelligence processes include object tracking, scene subtraction, pose estimation, and key-point estimation, wherein the scene subtraction includes detection of moving objects and segmentation of objects, wherein the moving objects include tools, the personnel, slings, vehicles, and taglines, and the segmentation includes tool and hand segmentation. The artificial intelligence processes execute on edge devices or devices remote to the workshop or both, and the artificial intelligence processes include models, wherein the models include a light model and a heavy model, wherein the light model detects events, wherein the events comprise workshop-related events, and the heavy model processes the data when the light model detects the workshop-related events.

The method 700 includes filtering 706 the processed image data using a plurality of filters to produce filtered data, wherein the plurality of filters removes false positive examples based on pre-defined object metrics, aspect ratio, intersection over union, and dice coefficient, and the plurality of filters includes slicing aided hyper-inferencing and confluence, wherein the slicing aided hyper-inferencing enables the objects within a pre-selected distance from a collection device to be detected, and the plurality of filters includes confluence, wherein the confluence enables overlapping object types to be detected.

The method 700 includes aggregating 708 the filtered data at various levels in the workshop, wherein the filtered data are aggregated across workshop bays, floors, buildings, and locations, and time periods the aggregated data are mapped from a 2D mapping projecting camera viewpoint onto a 2D map using homographic transformation, wherein the aggregated data preserve a consistent person identification during the personnel tracking to accurately determine a count of the personnel, the homographic transformation protects the object from over/under count, and massaging the aggregated data, wherein massaging comprises executing operations to update a fidelity and an accuracy of the aggregated data.

The method 700 includes executing 710 data correction processes on the aggregated filtered data over a plurality of time stamps producing corrected data, including: removing random noisy data from the aggregated filtered data producing intermediate data, wherein the random noisy data include discrepancies in the count of the personnel; counting the personnel from frame to frame of the intermediate data, wherein the personnel are counted as they pass a location in the workshop, and the personnel are counted as they are working on assets; filtering the corrected data using a low pass filter and/or a time series filter, wherein the low pass filter includes a moving average filter, wherein the moving average filter removes jitters in the intermediate data, wherein the jitters arise from the count of the personnel in a bay or the personnel passing other personnel who are handling the tools; performing a Fast Fourier Transform (FFT) using FFT convolution on the intermediate data to produce time series data; and detecting anomalies/outliers in the time series data by identifying trends, seasonality, and noise in the time series data to produce the corrected data.

In one embodiment, throughout the functionality, the system learns and improves as the machine learning processes continue to receive feedback on accuracy and other parameters. In one embodiment, key data and KPIs from business workflows are integrated into the system. With this integration, the system and its use of camera analytics can provide managers zone-specific data insights. The metrics can also be aggregated up the chain as more workshops utilize the system, thereby giving a bigger scope of understanding on a division, geographic, or company level.

The method 700 includes determining 712 an estimate of the safety non-compliance in the use cases from the corrected data, wherein the estimate is based on pre-selected thresholds for the use cases, providing 714 alerts associated with the estimate, and determining 716 the performance for workflows associated with the workshop based on the corrected data, the estimate, or both. The method 700 includes displaying 718 the performance and the personnel during the safety non-compliance, wherein the performance is computed at a plurality of the time stamps, the performance includes the count of the personnel in a location, a personal protective equipment usage non-compliance percentage, a vehicle encounter non-compliance percentage, a mechanical lifting non-compliance percentage, an amount of a wrench time, an effective capacity, an amount of technician hours, an amount of data entry time, an amount of bench utilization, and an amount of tool on bench time, a state of the performance is changed based on the corrected data that are gathered at different of the time stamps, and a display of the personnel includes anonymizing the personnel in the display, wherein the anonymizing includes blurring the display. The method 700 includes generating 710 an instruction to implement behavior to correct the safety non-compliance.

In some embodiments, the methods of the present disclosure may be executed by a computing system. FIG. 1A illustrates an example of such a computing system 100, in accordance with some embodiments. The computing system 100 may include a computer or computer system 403, which may be an individual computer system 403 or an arrangement of distributed computer systems. The computer system 403 includes one or more analysis modules, such as, for example, but not limited to, data reception modules 401, that are configured to perform various tasks according to some embodiments, such as one or more methods disclosed herein. To perform these various tasks, the analysis module executes independently, or in coordination with, one or more processors 403, which is (or are) connected to one or more storage media 405/407. The processor(s) 403 is (or are) also connected to a network interface to allow the computer system 403 to communicate over a data network with one or more additional computer systems and/or computing systems that may or may not share the same architecture as computer system 403, and may be located in different physical locations, other computer systems and user interface devices 409 may be located in a processing facility, while in communication with one or more computer systems that are located in one or more data centers, and/or located in varying countries on different continents).

A processor may include a microprocessor, microcontroller, processor module or subsystem, programmable integrated circuit, programmable gate array, or another control or computing device.

The storage media 407 may be implemented as one or more computer-readable or machine-readable storage media. Note that while in the example embodiment of FIG. 1A storage media 407 is depicted as a single device, in some embodiments, storage media 407 may be distributed within and/or across multiple internal and/or external enclosures of computing system 403 and/or additional computing systems. Storage media 407 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices, or may be cloud storage 405. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 403 monitors seismic-related workshop technician performance and workshop safety non-compliance. It should be appreciated that computing system 403 is merely one example of a computing system, and that computing system 403 may have more or fewer components than shown, may combine additional components not depicted in the example embodiment of FIG. 1A, and/or computing system 403 may have a different configuration or arrangement of the components depicted in FIG. 1A. The various components shown in FIG. 1A may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAS, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 100, FIG. 1A), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to explain at least some of the principals of the disclosure and their practical applications, to thereby enable others skilled in the art to utilize the disclosed methods and systems and various embodiments with various modifications as are suited to the particular use contemplated.

What is claimed is:

1. A computing system for detecting safety non-compliance and monitoring performance in a workshop, the computer system comprising:
   one or more processors; and
   a memory system comprising one or more non-transitory computer-readable media storing instructions that, when executed by at least one of the one or more processors, cause the computing system to perform operations, the operations comprising:
      receiving data, wherein the data comprises image data, video data, or both, and wherein the data is received from the workshop;
      executing artificial intelligence processes to perform mechanical lifting non-compliance detection, generic load lifting non-compliance detection, or personnel proximity to moving vehicle detection by processing the data to produce processed image data;
      filtering the processed image data using a plurality of filters to produce filtered data, wherein the plurality of filters:
         removes false positive examples based on pre-defined object metrics, aspect ratio, intersection over union, and dice coefficient, and
         includes slicing aided hyper-interfacing enabling objects and confluence wherein the slicing aided hyper-interfacing enables objects within a pre-selected distance from a collection device to be detected, and the confluence enables overlapping object types to be detected;
      aggregating the filtered data at various levels in the workshop;
      executing data correction processes on the aggregated filtered data over a plurality of time stamps producing corrected data;
      determining an estimate of the safety non-compliance from the corrected data;
      providing alerts associated with the estimate;
      determining the performance for workflows associated with the workshop based on the corrected data, the estimate, or both;
      displaying the performance and personnel during the safety non-compliance; and
      generating an instruction to implement behavior to correct the safety non-compliance.

2. The computing system as in claim 1 wherein the data comprise:
   images from use cases, wherein
      the use cases include personal protective equipment detection, tracking of personnel, workshop utilization, technician count, asset identification, mechanical lifting detection, tool detection, red zone detection, tagline detection, personnel anonymization, generic load detection, proximity to moving vehicle detection, and performance indicator determination.

3. The computing system as in claim 1 wherein the artificial intelligence processes comprise:
   object tracking, scene subtraction, pose estimation, and key-point estimation, wherein
      the scene subtraction includes detection of moving objects and segmentation of objects, wherein
         the moving objects include tools, the personnel, slings, vehicles, and taglines, and
         the segmentation includes tool and hand segmentation.

4. The computing system as in claim 1 wherein the artificial intelligence processes execute on edge devices or devices remote to the workshop or both.

5. The computing system as in claim 1 wherein the artificial intelligence processes include models, wherein
   the models include a light model and a heavy model, wherein
      the light model detects events, wherein
         the events comprise workshop-related events, and
         the heavy model processes the data when the light model detects the workshop-related events.

6. The computing system as in claim 1 wherein the filtered data are aggregated across workshop bays, floors, buildings, and locations, and time periods.

7. The computing system as in claim 3 wherein the aggregated filtered data are mapped from a 2D mapping projecting camera viewpoint onto a 2D map using homographic transformation, wherein
   the aggregated filtered data preserve a consistent person identification during the personnel tracking to accurately determine a count of the personnel,
   the homographic transformation protects the objects from over/under count, and
   massaging the aggregated filtered data, wherein massaging comprises executing operations to update a fidelity and an accuracy of the aggregated filtered data.

8. The computing system as in claim 1 wherein:
   the performance is computed at a plurality of the time stamps,
   the performance includes a count of the personnel in a location, a personal protective equipment usage non-compliance percentage, a vehicle encounter non-compliance percentage, a mechanical lifting non-compliance percentage, an amount of a wrench time, an effective capacity, an amount of technician hours, an amount of data entry time, an amount of bench utilization, and an amount of tool on bench time,
   a state of the performance is changed based on the corrected data that are gathered at different of the time stamps, and
   a display of the personnel includes anonymizing the personnel in the display, wherein the anonymizing includes blurring the display.

9. A computing system for detecting safety non-compliance and monitoring performance in a workshop, the computer system comprising:
   one or more processors; and
   a memory system comprising one or more non-transitory computer-readable media storing instructions that, when executed by at least one of the one or more processors, cause the computing system to perform operations, the operations comprising:
      receiving data, wherein the data comprises image data, video data, or both, and wherein the data is received from the workshop;
      executing artificial intelligence processes to perform mechanical lifting non-compliance detection, generic load lifting non-compliance detection, or personnel proximity to moving vehicle detection by processing the data to produce processed image data;
      filtering the processed image data using a plurality of filters to produce filtered data;
      aggregating the filtered data at various levels in the workshop;
      removing random noisy data from the aggregated filtered data producing intermediate data, wherein the random noisy data include discrepancies in account a count of the personnel;
      executing data correction processes on the aggregated filtered data over a plurality of time stamps producing corrected data;
      filtering the corrected data using a low pass filter and/or a time series filter, wherein
         the low pass filter includes a moving average filter, wherein
            the moving average filter removes jitters in the intermediate data, wherein
               the jitters arise from the count of the personnel in a bay or
               the personnel passing other personnel who are handling the tools;
      performing a Fast Fourier Transform (FFT) using FFT convolution on the intermediate data to produce time series data;
      detecting anomalies/outliers in the time series data by identifying trends, seasonality, and noise in the time series data to produce the corrected data;
      determining an estimate of the safety non-compliance from the corrected data;
      providing alerts associated with the estimate;
      determining the performance for workflows associated with the workshop based on the corrected data, the estimate, or both;
      displaying the performance and personnel during the safety non-compliance; and
      generating an instruction to implement behavior to correct the safety non-compliance.

10. The computing system as in claim 9 further comprising:
   counting the personnel from frame to frame of the intermediate data, wherein
      the personnel are counted as they pass a location in the workshop, and
      the personnel are counted as they are working on assets.

11. A non-transitory computer-readable medium storing instructions that, when executed by one or more processors of a computing system, cause the computing system to perform operations for detecting safety non-compliance and monitoring performance in a workshop, the operations comprising:
   receiving data, wherein the data comprises image data, video data, or both, and wherein the data is received from the workshop, wherein
      the data include images from use cases, wherein
      the use cases include personal protective equipment non-compliance detection, tracking of personnel, workshop utilization, technician count, asset identification, mechanical lifting non-compliance detection, tool non-compliance detection, red zone non-compliance detection, tagline non-compliance detection, personnel anonymization, generic load non-compliance detection, proximity to moving vehicle detection, and performance indicator determination;
   executing artificial intelligence processes to perform mechanical lifting non-compliance detection, generic load lifting non-compliance detection, or personnel proximity to moving vehicle detection by processing the data to produce processed image data, wherein
      the artificial intelligence processes include object tracking, scene subtraction, pose estimation, and keypoint estimation, wherein
         the scene subtraction includes detection of moving objects and segmentation of objects, wherein
            the moving objects include tools, the personnel, slings, vehicles, and taglines, and
            the segmentation includes tool and hand segmentation;
      the artificial intelligence processes execute on edge devices or devices remote to the workshop or both, and
      the artificial intelligence processes include models, wherein
         the models include a light model and a heavy model, wherein
            the light model detects events, wherein
               the events comprise workshop-related events, and
               the heavy model processes the data when the light model detects the workshop-related events;
   filtering the processed image data using a plurality of filters to produce filtered data, wherein
      the plurality of filters removes false positive examples based on pre-defined object metrics, aspect ratio, intersection over union, and dice coefficient, and
      the plurality of filters includes slicing aided hyper-inferencing and confluence, wherein
         the slicing aided hyper-inferencing enables the objects within a pre-selected distance from a collection device to be detected, and
         the plurality of filters includes confluence, wherein
            the confluence enables overlapping object types to be detected;
   aggregating the filtered data at various levels in the workshop, wherein
      the filtered data are aggregated across workshop bays, floors, buildings, and locations, and time periods,
      the aggregated data are mapped from a 2D mapping projecting camera viewpoint onto a 2D map using homographic transformation, wherein
         the aggregated data preserve a consistent person identification during the personnel tracking to accurately determine a count of the personnel,
         the homographic transformation protects the object from over/under count, and massaging the aggregated data, wherein massaging comprises executing operations to update a fidelity and an accuracy of the aggregated data;
executing data correction processes on the aggregated filtered data over a plurality of time stamps producing corrected data, including:
removing random noisy data from the aggregated filtered data producing intermediate data, wherein
the random noisy data include discrepancies in the count of the personnel;
counting the personnel from frame to frame of the intermediate data, wherein
the personnel are counted as they pass a location in the workshop, and
the personnel are counted as they are working on assets;
filtering the corrected data using a low pass filter and/or a time series filter, wherein
the low pass filter includes a moving average filter, wherein
the moving average filter removes jitters in the intermediate data, wherein
the jitters arise from the count of the personnel in a bay or the personnel passing other personnel who are handling the tools;
performing a Fast Fourier Transform (FFT) using FFT convolution on the intermediate data to produce time series data; and
detecting anomalies/outliers in the time series data by identifying trends, seasonality, and noise in the time series data to produce the corrected data;

determining an estimate of the safety non-compliance in the use cases from the corrected data, wherein
the estimate is based on pre-selected thresholds for the use cases;
providing alerts associated with the estimate;
determining the performance for workflows associated with the workshop based on the corrected data, the estimate, or both;
displaying the performance and the personnel during the safety non-compliance, wherein
the performance is computed at a plurality of the time stamps,
the performance includes the count of the personnel in a location, a personal protective equipment usage non-compliance percentage, a vehicle encounter non-compliance percentage, a mechanical lifting non-compliance percentage, an amount of a wrench time, an effective capacity, an amount of technician hours, an amount of data entry time, an amount of bench utilization, and an amount of tool on bench time,
a state of the performance is changed based on the corrected data that are gathered at different of the time stamps, and
a display of the personnel includes anonymizing the personnel in the display, wherein
the anonymizing includes blurring the display; and
generating an instruction to implement behavior to correct the safety non-compliance.

* * * * *